(12) United States Patent
Rice

(10) Patent No.: US 7,023,188 B1
(45) Date of Patent: Apr. 4, 2006

(54) METHOD OF FORMING A MULTI-PHASE POWER SUPPLY CONTROLLER

(75) Inventor: Benjamin M. Rice, Attleboro, MA (US)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 35 days.

(21) Appl. No.: 10/937,684

(22) Filed: Sep. 10, 2004

(51) Int. Cl.
*G05F 1/44* (2006.01)
(52) U.S. Cl. .................... 323/271; 323/282
(58) Field of Classification Search ........ 323/222–225, 323/237, 265, 268, 271, 272, 282, 283; 363/65
See application file for complete search history.

(56) References Cited

U.S. PATENT DOCUMENTS

| 6,670,794 B1* | 12/2003 | Wang et al. ............... 323/213 |
| 6,839,252 B1* | 1/2005 | Tai et al. .................... 363/65 |
| 6,897,636 B1* | 5/2005 | Harris ........................ 323/272 |
| 6,922,044 B1* | 7/2005 | Walters et al. ............. 323/288 |
| 6,965,219 B1* | 11/2005 | Brooks et al. ............. 323/282 |

* cited by examiner

*Primary Examiner*—Gary L. Laxton
(74) *Attorney, Agent, or Firm*—Robert F. Hightower

(57) ABSTRACT

In one embodiment, a power supply controller has a plurality of PWM control channels. The PWM control signals of the PWM control channels are selectively alternated among the outputs of the power supply controller.

20 Claims, 16 Drawing Sheets

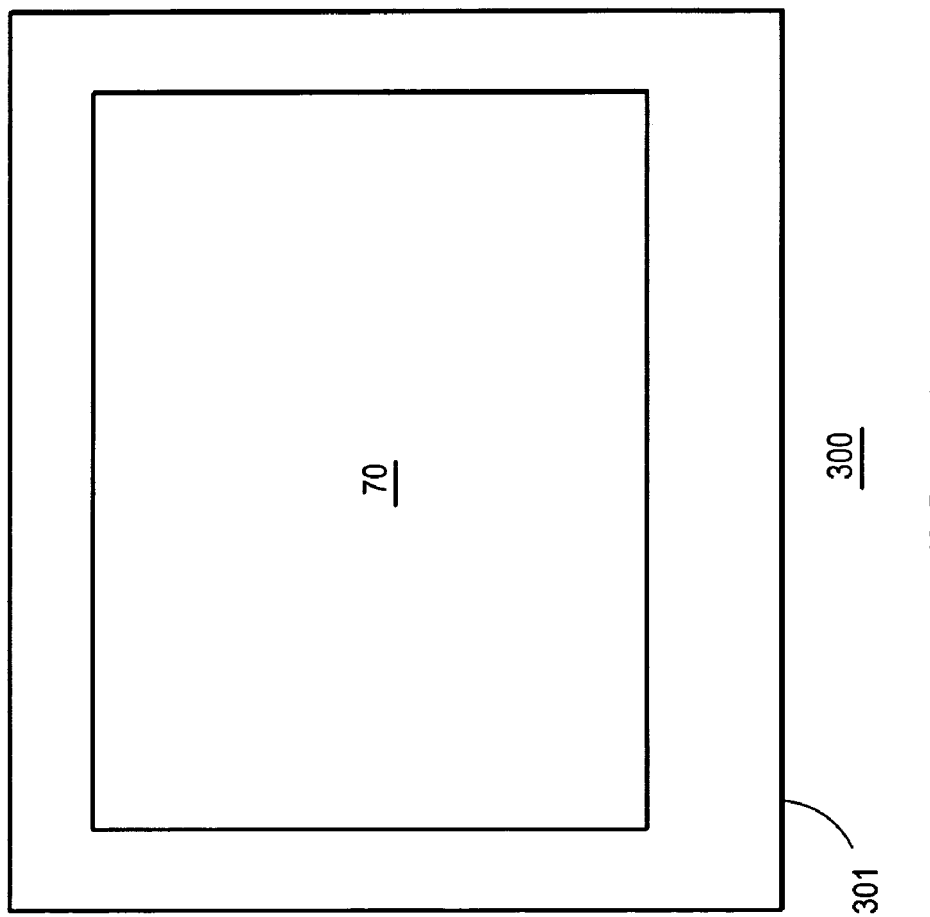

METHOD OF FORMING A MULTI-PHASE POWER SUPPLY CONTROLLER

BACKGROUND OF THE INVENTION

The present invention relates, in general, to electronics, and more particularly, to methods of forming semiconductor devices and structure.

In the past, the electronics industry utilized various methods and structures to produce multi-phase power supply systems. A typical multi-phase power supply system divided a load of the power supply system into several regions. The power supply controller was also divided into a number of channels or phases. In some cases, each phase was assigned to a particular region of the load. The different phases had a power switch to provide switching of the input power. A pulse width modulator (PWM) circuit provided a variable duty cycle PWM signal to control the switching for each phase. All of the phases were summed together to generate a single output voltage. One problem with the prior controllers was offset errors and inaccuracies in the components within the controllers. For example, the error amplifiers had input offset errors and the PWM comparators had threshold differences. The ability to equally share the load current between the channels or phases was affected by these and other variations in the respective PWM circuits and switches. For example different PWM comparators may have different offsets that affected the PWM duty cycles and the resulting load currents, variations in the values of passive components such as ramp capacitors often affected the load currents. Thus, each channel and the associated passive and active components had to be sized to carry the maximum current value instead of an average current value. Increasing the current carrying potential of each channel increased the size of the power transistors, associated drivers, passive components, and other portions of system thereby increasing the costs of the power supply system.

Accordingly, it is desirable to have a method of forming a multi-phase power supply system and power supply controller that more equally distributes the load current between each of the phases, that reduces the cost of the switches, and that reduces the costs of the passive components of the system.

BRIEF DESCRIPTION OF THE DRAWINGS

FIG. 16 schematically illustrates an enlarged plan view of a semiconductor device that includes a portion of the power supply system of FIG. 1 in accordance with the present invention.

For simplicity and clarity of illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention.

DETAILED DESCRIPTION OF THE DRAWINGS

Figure 1:
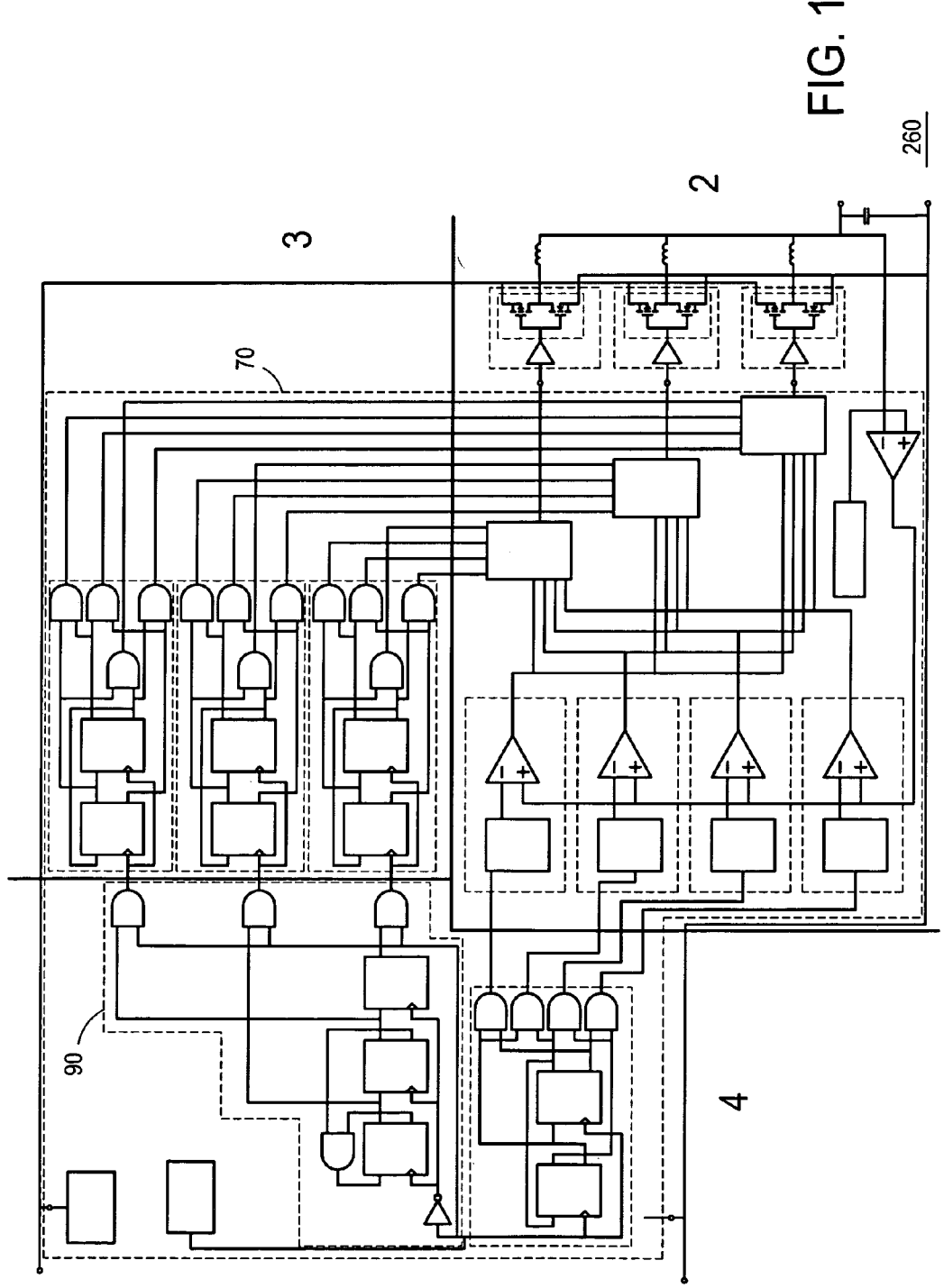
FIG. 1 schematically illustrates a block diagram view of an embodiment of a portion of a power supply system in accordance with the present invention.
Figure 2:
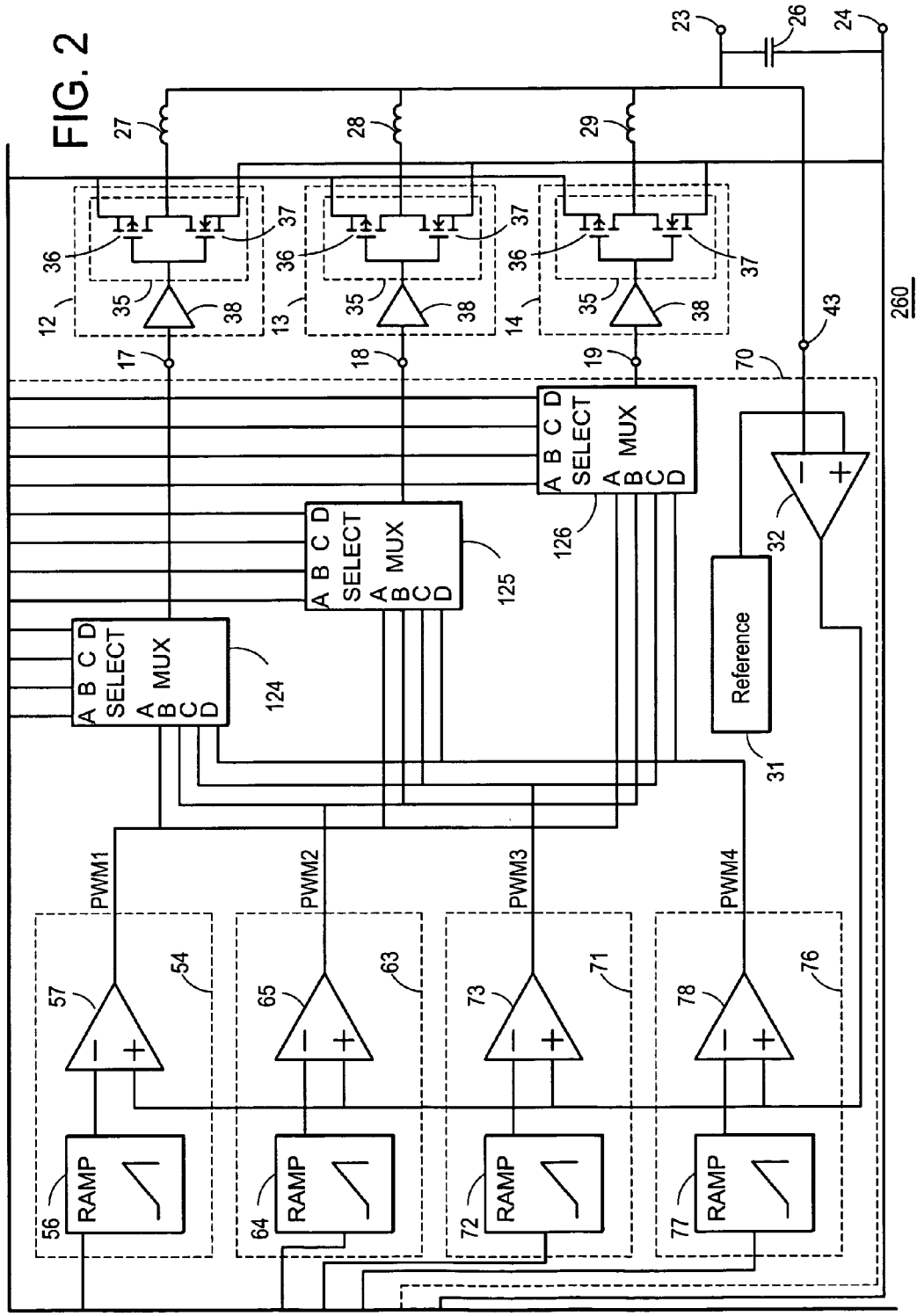
FIG. 2 through FIG. 4 schematically illustrate some details of the block diagram of the embodiment of the power supply system of FIG. 1 in accordance with the present invention.
Figure 3:
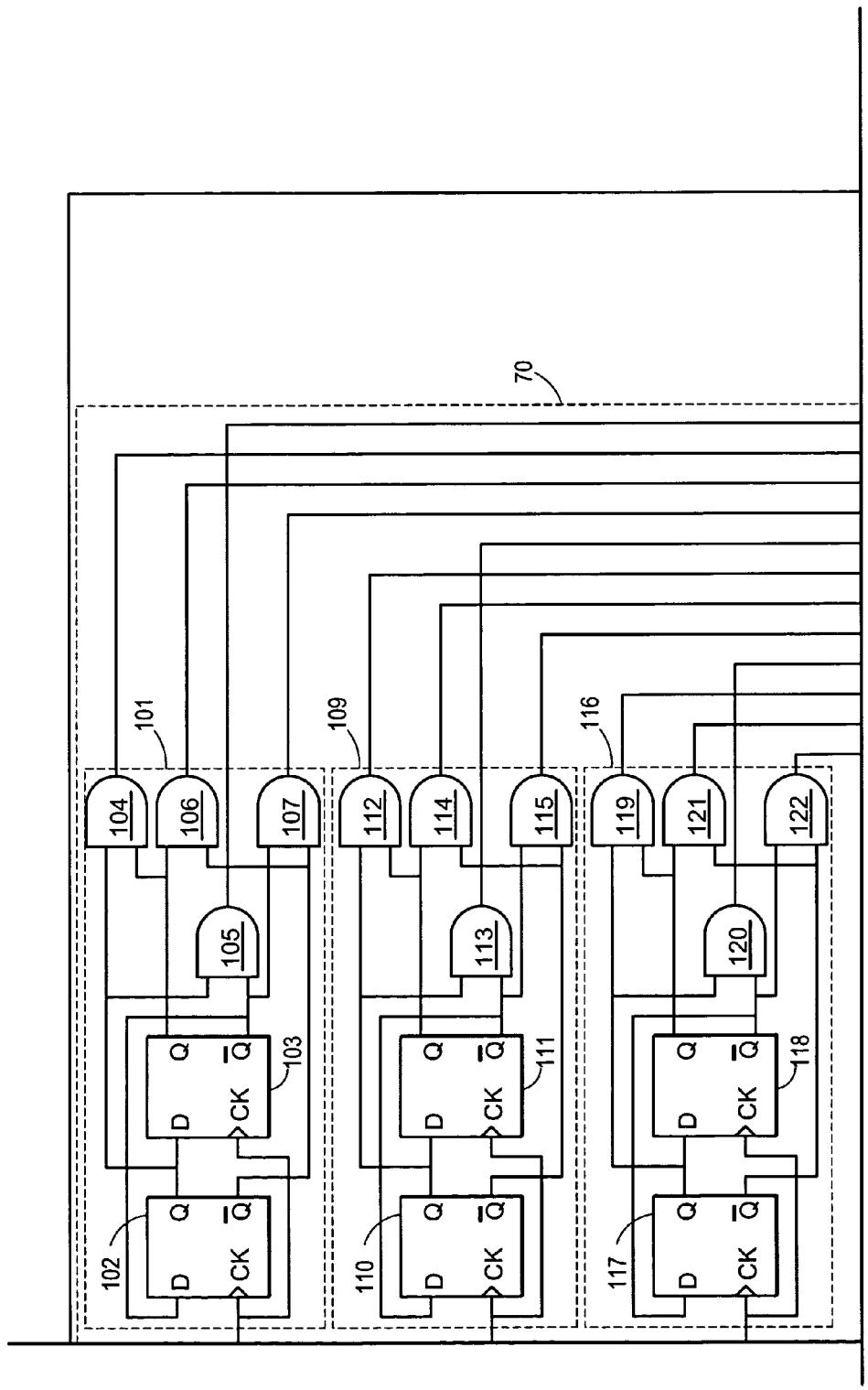
Figure 4:
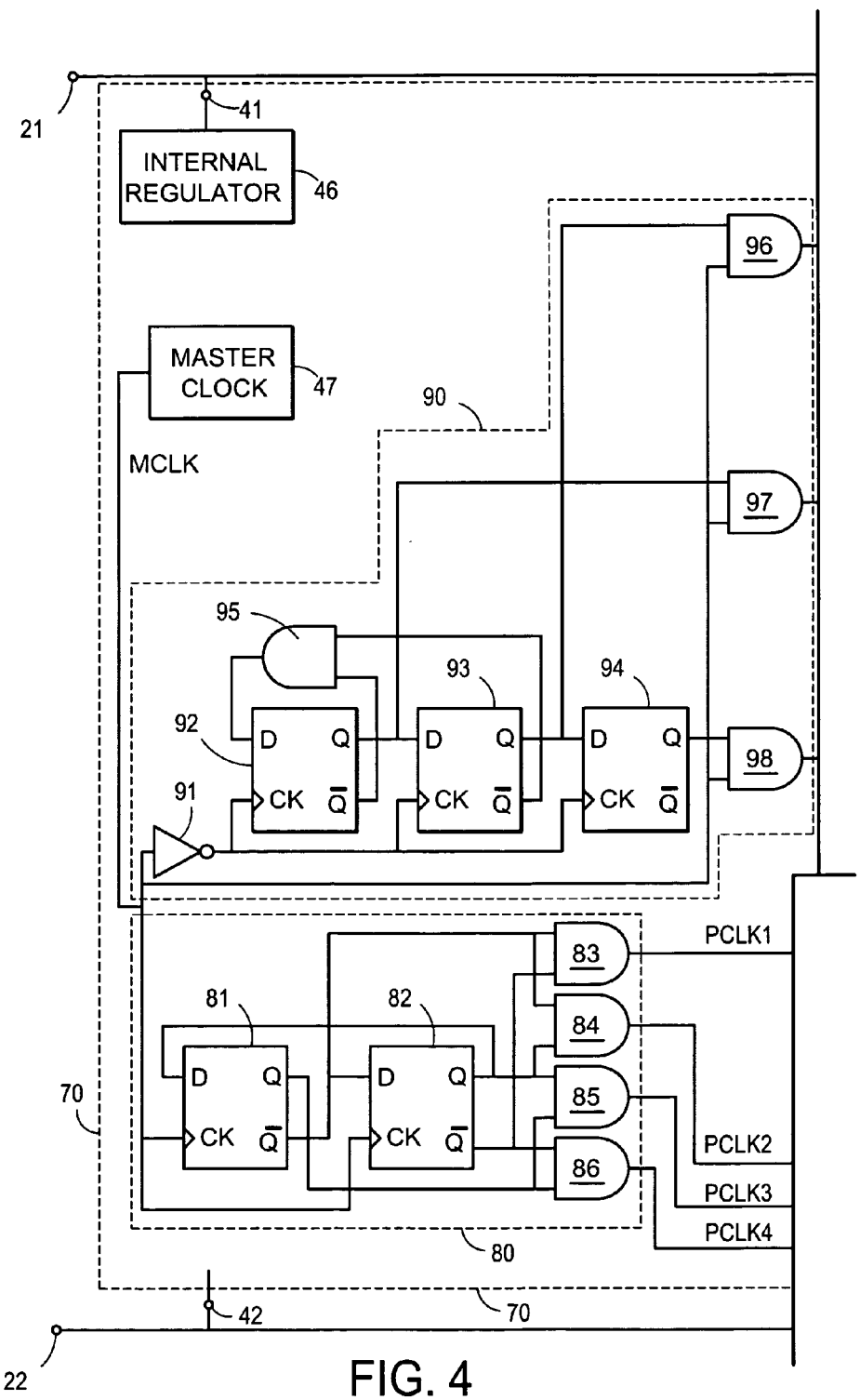

FIG. 1 schematically illustrates a block diagram view of an embodiment of a portion of a power supply system 260. FIG. 2 through FIG. 4 schematically illustrate some details of the block diagram of the embodiment of system 260 illustrated in FIG. 1. The block diagram of FIG. 1 illustrates the relative positional relationships between FIGS. 2–4. This description has references to FIG. 1 through FIG. 4. Power supply system 260 includes a power supply controller 70 that selectively couples different PWM control signals to the outputs of controller 70 for different time periods in order to facilitate selectively driving different power switches with the different PWM control signals. Selectively assigning a different PWM control signal to each output during a different time period assists in distributing among all of the outputs of controller 70 the errors or offsets of the different components of both controller 70 and of system 260. Power supply system 260 receives power between a power input 21 and a power return 22 and provides an output voltage between an output terminal 23 and a return terminal 24. The power applied between input 21 and return 22 typically is a rectified DC signal. Return terminal 24 typically is coupled to power return 22. A load (not shown) usually is connected to terminals 23 and 24 to receive the output voltage and a load current from system 260. In addition to controller 70, system 260 typically includes a plurality of power channels including a first power channel 12, a second power channel 13, and a third power channel 14. Power channels 12, 13, and 14 typically are connected to an energy storage inductor such as respective inductors 27, 28, and 29. An energy storage capacitor 26 usually is connected between terminals 23 and 24. Each of power channels 12, 13, and 14 typically include a power switch 35 and a driver 38 that provides sufficient current to enable and disable switch 35. In some embodiments, switch 35 includes an upper power transistor 36 coupled in a series totem pole configuration with a lower power transistor 37.

Such drivers and power switches are well known to those skilled in the art. Power channels 12, 13, and 14 typically are external to controller 70 but in some embodiments may be included within controller 70. Capacitor 26 and inductors 27, 28, and 29 typically are external to controller 70.

Controller 70 is formed to include a plurality of drive outputs including drive outputs 17, 18, and 19 and generally has one drive output for each power channel of system 260. Controller 70 is also formed to include a plurality of PWM channels, including a first PWM channel 54, a second PWM channel 63, a third PWM channel 71, and a fourth PWM channel 76. Each PWM channel is formed to produce a respective first, second, third, and fourth PWM control signal on a respective output of the PWM channel. Controller 70 generally is formed to have more PWM channels than drive outputs, thus, more PWM channels than the power channels of system 260. Controller 70 is formed to selectively connect some of the plurality of PWM control signals to the plurality of drive outputs of during different time periods. Having more PWM channels than drive outputs and power channels facilitates selectively coupling different PWM control signals to different power channels during different time periods. Selectively coupling a different PWM control signal to each drive output during different time periods assists in distributing among all of the outputs of controller 70 the errors or offsets that are associated with the different portions of controller 70. Thus, the errors or offsets are distributed among all of the phases generated by system 260. The specific algorithm used to control the selection of the PWM control signals and the specific time periods may be one of many different algorithms. For the embodiment illustrated in FIGS. 1–4, controller 70 is formed to selectively couple three of the four PWM control signals from the plurality of PWM channels to the three drive outputs, outputs 17, 18, and 19, during a first time period, and to selectively change the assignment of PWM control signals to the outputs for subsequent different time periods. In order to accomplish the changing of the assignments, controller 70 implements an algorithm that sequentially rotates the drive outputs through the four PWM control signals generated by controller 70. Thus, controller 70 selectively changes the distribution of the assignment of the plurality of outputs among the plurality of PWM control signals for different time periods. As will be seen further hereinafter, other embodiments of system 260 and controller 70 can use different selection algorithms. The specific logic and partitioning illustrated for the embodiment of controller 70 illustrated in FIGS. 1–4 is one example of an algorithm and associated control logic that provides the function of selectively coupling different PWM control signals to the drive outputs of controller 70 for different time periods and distributing errors of the different elements of controller 70 among each of the outputs of controller 70 and among the phases of system 260.

In order to provide the selective assigning of the PWM signals to the outputs, controller 70 also includes a PWM phasing generator or phase generator 80, a multiplexer clock generator or multiplexer clock or Mux clock 90, a plurality of multiplexers or Muxs including a first output multiplexer or Mux 124, a second output multiplexer or Mux 125, and a third output multiplexer or Mux 126, in addition to a plurality of multiplexer logic channels including multiplexer logic channels or Mux logic channels 101, 109, and 116. Controller 70 is also formed to include a master clock 47 that generates a high-frequency clock master clock (MCLK) utilized to generate the different timing and phasing that will be explained further hereinafter, a voltage reference generator or reference 31, and an error amplifier 32. Amplifier 32 receives a feedback (FB) signal that is received on a FB input 43 of controller 70. The FB signal is connected to provide a signal that is representative of the output voltage between terminals 23 and 24. Controller 70 receives power between a power input 41 and a power return 42. An internal regulator 46 receives the power from input 41 and generates an internal voltage for operating the elements within controller 70. Although not shown for simplicity of the drawings, regulator 46 typically is connected between input 41 and return 42. Return 42 typically is connected to return 22 of system 260.

Mux clock 90 along with Mux logic channels 101, 109, and 116 are formed to control the select inputs to multiplexers 124, 125, and 126 in order to facilitate the selective coupling of PWM control signals to the drive outputs of controller 70. Phase generator 80 along with Mux clock 90, and Mux logic channels 101, 109, and 116 assist in controlling the time periods. Mux clock 90 includes D-type flip-flops 92, 93, and 94, inverter 91, and AND gates 95, 96, 97 and 98 that facilitate forming clock signals to operate Mux logic channels 101, 109, and 116. Mux logic channel 116 includes D-type flip-flops 117 and 118 and a plurality of AND gates including AND gates 119, 120, 121, and 122 that are formed to generate select signals for Mux 124. MUX logic channel 109 includes D-type flip-flops 110 and 111, and a plurality of AND gates 112, 113, 114, and 115 that are formed to generate select signals that are applied to Mux 125. Similarly, Mux logic channel 101 includes D-type flip-flops 102 and 103 and a plurality of AND gates including AND gates 104, 105, 106, and 107 that are formed to generate select signals for Mux 126. First PWM channel 54 includes a ramp generator or ramp 56 and a comparator 57 that are used to generate a first PWM control signal (PWM1) on an output of comparator 57, thus, on an output of channel 54. Second PWM channel 63 similarly includes a ramp generator or ramp 64 and a comparator 65 that are used to generate a second PWM control signal (PWM2) on an output of comparator 65, thus, on an output of channel 63. PWM channel 71 includes a ramp generator or ramp 72 and a comparator 73 there utilized to generate a third PWM control signal (PWM3) on an output of comparator 73, thus, on an output of channel 71. Similarly, PWM channel 76 includes a ramp generator or ramp 77 and a comparator 78 that are utilized to generate a fourth PWM control signal (PWM4) on an output of comparator 78, thus, on an output of channel 76. Comparators 57, 65, 73, and 78 receive the error voltage from amplifier 32 and the ramp signal from respective ramps 56, 64, 72, and 77, and responsively generate the respective PWM control signals. PWM channels that generate such PWM control signals are well known in the art. Phase generator 80 includes D-type flip-flops 81 and 82, and AND gates 83, 84, 85, and 86 that facilitate forming clock signals to operate PWM channels 54, 63, 71, and 76. The clock signals generated by gates 83, 84, 85, and 86 are referred to respectively as PCLK 1, PCLK 2, PCLK 3, and PCLK 4.

Figure 5:
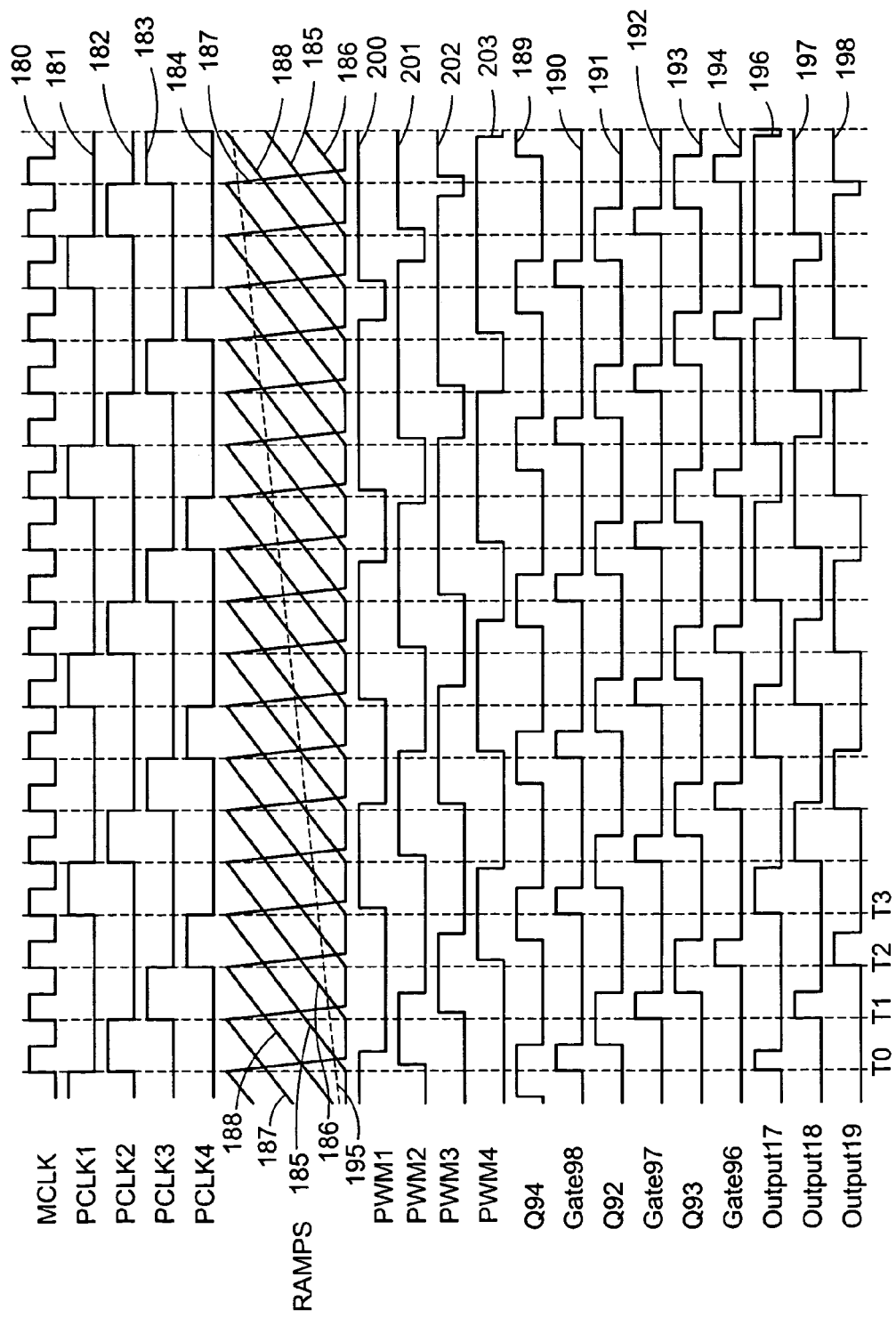
FIG. 5 is a graph having plots that illustrate signals at various points within the power supply system of FIG. 1 and FIGS. 2–4 in accordance with the present invention.

FIG. 5 is a graph having plots that illustrate some of the operational signals within controller 70. The abscissa illustrates time and the ordinate illustrates various signal levels. A plot 180 illustrates the MCLK output of master clock 47. Plots 181, 182, 183, and 184 illustrate the respective PCLK 1, PCLK 2, PCLK 3 and PCLK 4 outputs of gates 83, 84, 85, and 86 of phase generator 80. Plots 185, 186, 187, and 188 illustrate the respective ramp signals generated by respective ramps 56, 64, 72, and 77, and plots 200, 201, 202, and 203 illustrate the respective PWM1, PWM2, PWM3, and PWM4 control signals on the outputs of PWM channels 54, 63, 71, and 76. A plot 195 illustrates the error voltage output of amplifier 32 relative to the ramps signals generated by ramps 56, 64, 72, and 77. Plots 189, 191, and 193 illustrate the respective enable signals generated by the Q outputs of flip-flops 94, 92, and 93 of Mux clock 90. Plots 190, 192, and 194 illustrate the respective clock signals generated by the outputs of gates 98, 97, and 96 of Mux clock 90. Plots 196, 197, and 198 illustrate the respective drive signals on drive outputs 17, 18, and 19 of controller 70. This description will have references to FIGS. 1–5.

Master clock 47 generates the master clock signal (MCLK) that is utilized to control the phasing and selecting of the PWM control signals coupled to drive outputs 17, 18, and 19. Phase generator 80 receives MCLK and generates four non-overlapping PWM clock signals (PCLK 1, PCLK 2, PCLK 3, PCLK 4) that are received by the plurality of PWM channels as illustrated by plots 181, 182, 183, and 184. Flip-flops 81 and 82 of phase generator 80 are connected to count using a counting scheme that only changes one output of flip-flops 81 and 82 at each rising edge of MCLK in order to minimize clock glitches. In the preferred embodiment, flip-flops 81 and 82 are connected to count in a gray code. The falling edge of PWM clock signals PCLK 1, PCLK 2, PCLK 3, and PCLK 4 is received by respective ramps 56, 64, 72, and 77 which responsively begin generating ramp signals as illustrated by respective plots 185, 186, 187, and 188.

During the operation of controller 70 and assuming that flip-flops 81, 82, 92, 93, 103, and 117 are initially cleared and flip-flops 94, 102, 110, 111, and 118 are initially set, just prior to a time T0 the output of gate 83 and the corresponding PCLK 1 is high ensuring that ramp 56 is discharged and that the output of ramp 56 is low. The output of gates 84, 85, and 86 and the corresponding PCLK 2, PCLK 3, and PCLK 4 are all low. At time T0, the rising edge of MCLK sets flip-flop 82 which drives the output of gate 83 and PCLK 1 low. The rising edge of MCLK also forces the output of gate 84 and the corresponding PCLK 2 signal high as illustrated by plots 181 and 182. The high from PCLK 2 is received by ramp 64 which responsively begins a discharge cycle and forces the output low. The outputs of gates 85 and 86 and the corresponding PCLK 3 and PCLK 4 signals remain low. Ramp 56 receives the falling edge of PCLK 1 and responsively generates a first ramp signal as illustrated by plots 181 and 185. Comparator 57 receives the error voltage from amplifier 32 and the first ramp signal from ramp 56. As long as the error voltage is greater than the value of ramp signal from ramp 56, the output of comparator 57 is high as illustrated by plot 200. Also at time T0, the rising edge of MCLK drives the output of gate 98 high which resets flop 118 and drives the output of gate 121 low and the output of gate 122 high. This steers output 17 from PWM2 to PWM1 and also transitions output 17 from low to high. Because flip-flops 117 and 118 are reset, the output of gate 122 is high and the output of gates 119, 120, and 121 are low so that Mux 124 selectively couples the PWM1 output of PWM channel 54 to output 17 as illustrated by plot 196. Flip-flops 110 and 111 are set, thus the output of gate 112 is high and the outputs of gates 113, 114, and 115 are low so that multiplexer 125 selectively couples the PWM3 output of PWM channel 71 to output 18 as illustrated by plot 197. Flip-flop 102 remains set and Flip-flop 103 remains reset, thus, the output of gate 105 is high and the output of gates 104, 106, and 107 are low and multiplexer 126 selectively couples the PWM4 output of PWM channel 76 to output 19 as illustrated by plot 198.

The next falling edge of MCLK changes Mux clock 90 to enable the Mux logic channels to receive MCLK and prepare to select different PWM control signals for the drive outputs of controller 70 on the next rising MCLK edge. This falling edge of MCLK sets flip-flop 92, resets flip-flop 94, and leaves flip-flop 93 cleared. The output of flip-flop 92 provides a high to one input of gate 97 to enable gate 97 to couple MCLK to Mux logic channel 109.

At time T1, the rising edge of MCLK sets flip-flop 81 forcing the output of gate 84 and PCLK 2 low in addition to driving the output of gate 85 and the corresponding PCLK 3 high. The output of gates 83 and 86 and the corresponding PCLK 1 and PCLK 4 remain low. The low going PCLK 2 is received by ramp 64 which initiates generating a ramp signal as illustrated by plot 186. The rising edge of MCLK is also received by gate 97 of Mux clock 90 which couples MCLK to flip-flops 110 and 111 thereby clearing flip-flop 110 and leaving flip-flop 111 set. The outputs of flip flops 110 and 111 force the output of gate 114 high and the outputs of gates 112, 113, and 115 low. The high on the output of gate 114 selectively enables Mux 125 to couple the PWM2 output of PWM channel 63 to output 18 of controller 70. Thus, multiplexer 125 previously selectively coupled the PWM3 control signal of channel 71 to output 18 and now selectively couples the PWM2 control signal of channel 63 to output 18.

The next falling edge of MCLK changes Mux clock 90 to enable the Mux logic channels to receive MCLK and prepare to select different PWM control signals for the PWM outputs of controller 70 on the next rising MCLK edge. This falling edge of MCLK clears flip-flop 92 and sets flip-flop 93 while leaving flip-flop 94 reset. The outputs of flip-flops 92, 93, and 94 remove the high to the input of gate 97 and provide a high to one input of gate 96 to couple MCLK to Mux logic channel 101.

At time T2 the rising edge of MCLK is received by gate 96 which couples the rising edge to flip-flops 102 and 103 to set flip-flop 103. The outputs of flip-flops 102 and 103 force the output of gate 104 high and the output of gates 105, 106, and 107 low. The high on the output of gate 104 selectively enables Mux 126 to couple the PWM3 output of PWM channel 71 to output 19 of controller 70. Thus, multiplexer 126 previously selectively coupled the PWM4 output of channel 76 to output 19 and now selectively couples the PWM3 output of channel 71 to output 19. The rising edge of MCLK also clears flip-flop 82 forcing the PCLK 3 output of gate 85 low and the PCLK 4 output of gate 86 high. The low going PCLK 3 is received by ramp 72 which responsively initiates generating a ramp signal as illustrated by plot 187.

The next falling edge of MCLK changes Mux clock 90 to enable the Mux logic channels to receive MCLK and prepare to select different PWM control signals for the PWM outputs of controller 70 on the next rising MCLK edge. This falling edge of MCLK sets flip-flop 94, clears flip-flop 93 and leaves flip-flop 92 cleared. The output of flip-flop 94 provides a high to one input of gate 98 to couple MCLK to Mux logic channel 116.

At time T3, the rising edge of MCLK clears flip-flop 81 and leaves flip-flop 82 cleared which drives the PCLK 4 output signal of gate 86 low and also forces the PCLK 1 output signal of gate 83 high as illustrated by plots 181 and 184. The outputs of gates 84 and 85 and the corresponding PCLK 2 and PCLK 3 remain low. Ramp 77 receives the falling edge of PCLK 4 and responsively initiates a ramp signal as illustrated by plots 184 and 188. Comparator 78 receives the error voltage from amplifier 32 and the ramp signal from ramp 77. As long as the error voltage is greater than the value of ramp 77, the output of comparator 78 is high as illustrated by plot 203. The rising edge of MCLK is also received by gate 98 which couples MCLK to flip-flops 117 and 118 thereby setting flip-flop 117 and leaving flip-flop 118 cleared. The outputs of flip flops 117 and 118 force the output of gate 120 high and the outputs of gates 119, 121, and 122 low. The high on the output of gate 120 selectively enables Mux 124 to couple the PWM4 output of channel 76 to output 17 of controller 70. Thus, Mux 124 previously selectively coupled the PWM1 output of channel 54 to output 17 and now selectively couples the PWM4 output of channel 76 to output 17.

The process continues for each MCLK cycle. On each rising edge of MCLK, the select inputs of one of Muxs 124, 125, or 126 is changed to couple a different PWM channel through the output Mux than was previously coupled through that particular output Mux on the previous MCLK cycle. For the embodiment illustrated in FIGS. 1 through 5, controller 70 sequentially rotates the selection by decrementing the PWM channel number that is selected for each output Mux. Those skilled in the art realize that the channel number can be incremented instead of decrementing. Each rising edge of MCLK also initiates ramp generation in one of PWM channels 54, 63, 71, or 76. The PWM channel selected for the ramp generation is the PWM channel that was idle or not used during the previous MCLK cycle. On each negative MCLK edge, Mux clock 90 selects the Mux logic channel that will change the select inputs of the output Mux on the next rising MCLK edge. Thus, it can be seen that the outputs of controller 70 initially are selectively coupled to receive a PWM control signal from a PWM channel output and that each output of controller 70 is sequentially rotated through the PWM channels with each MCLK cycle changing coupling between the outputs of controller 70 and the PWM channels. Using more PWM channels than outputs and a fixed algorithm facilitates using simple logic to implement the desired operation of controller 70.

Those skilled in the art will realize that rotating ramp comparators among ramp generators may also be used to implement the algorithm in addition to rotating entire PWM channels among the outputs.

In order to facilitate the previously described functionality for the embodiment illustrated in FIGS. 1–5, master clock 47 has an output commonly connected to an input of inverter 91, a clock input of flip-flops 81 and 82, and to a first input of gates 96, 97, and 98. An output of inverter 91 is commonly connected to a clock input of flip-flops 92, 93, and 94. A Q output of flip-flop 81 is commonly connected to a first input of gates 85 and 86. A Q bar output of flip-flop 81 is commonly connected to a D input of flip-flop 82 and a first input of gate 83 and 84. A Q output of flip-flop 82 is connected to a D input of flip-flop 81 and to a second input of gates 84 and 85. A Q bar output of flip-flop 82 is connected to a second input of gate 83 and 86. An output of gate 83 is connected to an input of ramp 56. An output of gate 84 is connected to an input of ramp 64. An output of gate 85 is connected to an input of ramp 72, and an output of gate 86 is connected to an input of ramp 77. An output of ramp 56 is connected to an inverting input of comparator 57. An output of ramp 64 connected to an inverting input of comparator 65. An output of ramp 72 is connected to an inverting input of comparator 73, and an output of ramp 77 is connected to an inverting input of comparator 78. An output of comparator 57 is commonly connected to a first input of multiplexers 124, 125, and 126. An output of comparator 65 is commonly connected to a second input of multiplexers 124, 125, and 126. An output of comparator 73 is commonly connected to a third input of multiplexers 124, 125, and 126. An output of comparator 78 is commonly connected to a fourth input of multiplexers 124, 125, and 126. An output of multiplexer 124 is connected to output 17. An output of multiplexer 125 is connected to output 18, and an output of multiplexer 126 is connected to output 19. An output of reference 31 is connected to a non-inverting input of amplifier 32 and an inverting input of amplifier 32 is connected to input 43. An output of amplifier 32 is commonly connected to the non-inverting input of comparators 57, 65, 73, and 78. A Q output of flip-flop 92 is connected to a second input of gate 97 and to a D input of flip-flop 93. A Q bar output of flip-flop 92 is connected to a first input of gate 95. A Q output of flip-flop 93 is connected to a second input of gate 96 and to a D input of flip-flop 94. A Q bar output of flip-flop 93 is connected to a second input of gate 95. An output of gate 95 is connected to a D input of flip-flop 92. A Q output of flip-flop 94 is connected to a second input of gate 98. An output of gate 96 is commonly connected to a clock input of flip-flops 102 and 103. An output of gate 97 is commonly connected to a clock input of flip-flops 110 and 111. An output of gate 98 is commonly connected to a clock input of flip-flops 117 and 118. A Q output of flip-flop 102 is connected to a D input of flip-flop 103 and to a first input of gates 104 and 105. A Q bar output flip-flop 102 is connected to a first input of gates 106 and 107. A Q output of flip-flop 103 is connected to a second input of gates 104 and 106. A Q bar output of flip-flop 103 is connected to a D input of flip-flop 102 and to a second input of gates 105 and 107. An output of gate 107 is connected to a first select input of multiplexer 126. An output of gate 106 is connected to a second select input of multiplexer 126. An output of gate 104 is connected to a third select input of multiplexer 126, and an output of gate 105 is connected to a fourth select input of multiplexer 126. A Q output of flip-flop 110 is connected to a D input of flip-flop 111 and to a first input of gates 112 and 113. A Q bar output of flip-flop 110 is connected to a first input of gates 114 and 115. A Q output of flip-flop 111 is connected to a second input of gates 112 and 114. A Q bar output of flip-flop 111 is connected to a D input of flip-flop 110 and to a second input of gates 113 and 115. An output of gate 115 is connected to a first select input of multiplexer 125. An output of gate 114 is connected to a second select input of multiplexer 125. An output of gate 112 is connected to a third select input of multiplexer 125, and an output of gate 113 is connected to a fourth select input of multiplexer 125. A Q output of flip-flop 117 is connected to a D input of flip-flop 118 and to a first input of gates 119 and 120. A Q bar output of flip-flop 117 is connected to a first input of gates 121 and 122. A Q output of flip-flop 118 is connected to a second input of gates 119 and 121. A Q bar output of flip-flop 118 connected to a D input of flip-flop 117 and to a second input of gates 120 and 122. An output of gate 122 is connected to a first select input of multiplexer 124. An output of gate 121 is connected to a second select input of multiplexer 124. An output of gate 119 is connected to a third select input of multiplexer 124, and an output of gate 120 is connected to a fourth select input of multiplexer 124.

Figure 6:
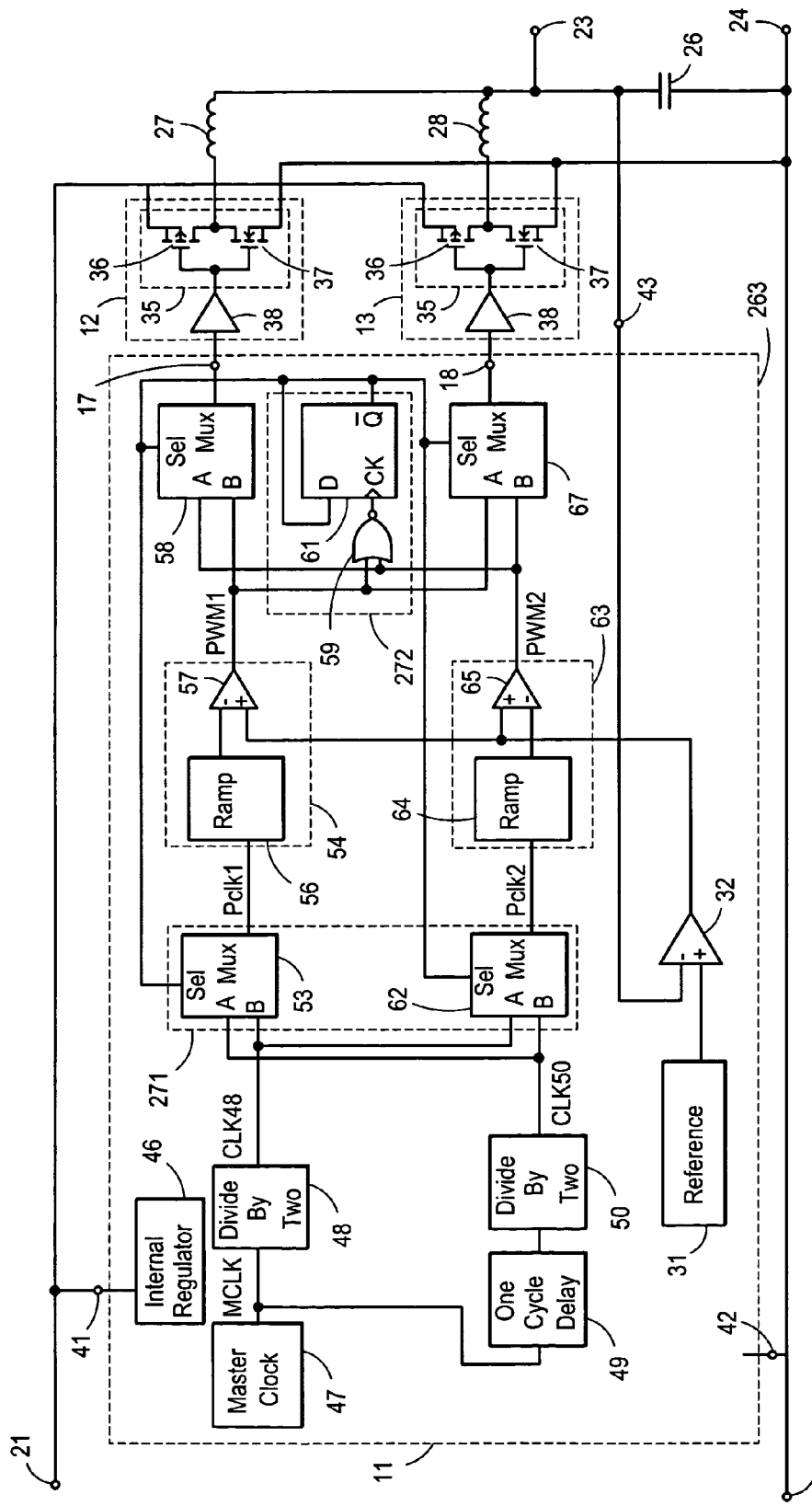
FIG. 6 schematically illustrates an embodiment of a portion of a second power supply system in accordance with the present invention.

FIG. 6 schematically illustrates an embodiment of a portion of a power supply system 262 that is an alternate embodiment of system 260 explained in the descriptions of FIGS. 1–4 and FIG. 5. System 262 has a power supply controller 263 that includes a plurality of PWM control channels that generate a plurality of PWM control signals, and also includes a plurality of drive outputs. Controller 263 selectively couples different PWM control signals to the outputs of controller 263 for different time periods to facilitate selectively driving different power switches of system 262 with the different PWM control signals. Controller 263 is formed to selectively couple some of the plurality of PWM control signals to the plurality of outputs during different time periods. Selectively assigning a different PWM control signal to at least a portion of the outputs during different time periods assists in distributing among all of the outputs of controller 263 the errors or offsets that are associated with the different portions of controller 263 and system 262. Thus, the errors or offsets are distributed among all of the phases generated by system 262. The specific algorithm used to control the selection of the PWM channels and the specific time periods may be one of many different algorithms. For the embodiment illustrated in FIG. 6, controller 263 has two PWM channels 54 and 63 and system 262 has two power channels 12 and 13 although more PWM channels and power channels optionally could be added. Controller 263 is formed to selectively couple one of the two PWM control signals from the plurality of PWM channels to the plurality of drive outputs during a first time period, and to selectively change the assignment of PWM control signals to the drive outputs for subsequent different time periods. In order to accomplish the changing of the assignments, controller 263 alternately swaps or rotates the PWM control signals between the drive outputs. Thus, controller 263 selectively changes the distribution of the assignment of the plurality of outputs among the plurality of PWM control signals for different time periods. The specific logic and partitioning illustrated for the embodiment of controller 263 illustrated in FIG. 6 is one example of an algorithm and control logic that provides the function of selectively coupling different PWM control signals to the drive outputs for different time periods and distributing errors of the different elements of controller 263 among each of the outputs of controller 263 and among the phases of system 262. As will be seen further hereinafter, other embodiments of system 262 and controller 263 use different selection and assignment algorithms. Controller 263 is also formed to adaptively increase or decrease the number of active PWM channels depending on the load current required by the load (not shown) connected between terminals 23 and 24. Those skilled in the art will realize from the description of the figures, that it is desirable to have more PWM control channels and PWM control signals than power stages in order to maintain very accurate regulation of the output voltage. However, some embodiments may have more power stages than PWM channels and PWM control signals. For such an embodiment it is possible that high load transients may force the suspension of the rotation algorithm in order to maintain accurate regulation of the output voltage. Alternatively, the rotation algorithm may be continued at the sacrifice of regulation accuracy.

Controller 263 includes a PWM phasing generator or phase generator 271, a multiplexer logic channel or Mux logic channel 272, a first output multiplexer or Mux 58, a second output multiplexer or Mux 67, a divide by two block 48, a one cycle clock delay block 49, and another divide by two block 50. Phase generator 271 includes a multiplexer or Mux 53 and a multiplexer or Mux 62. Mux logic channel 272 includes a D-type flip-flop 61 and a NOR gate 59. Block 48 divides MCLK by two to generate another clock signal (CLK48). Block 49 delays MCLK by one MCLK cycle and then block 50 divides the delayed MCLK by two to generate another clock signal (CLK50) that is offset from CLK48 by one MCLK cycle.

Figure 7:
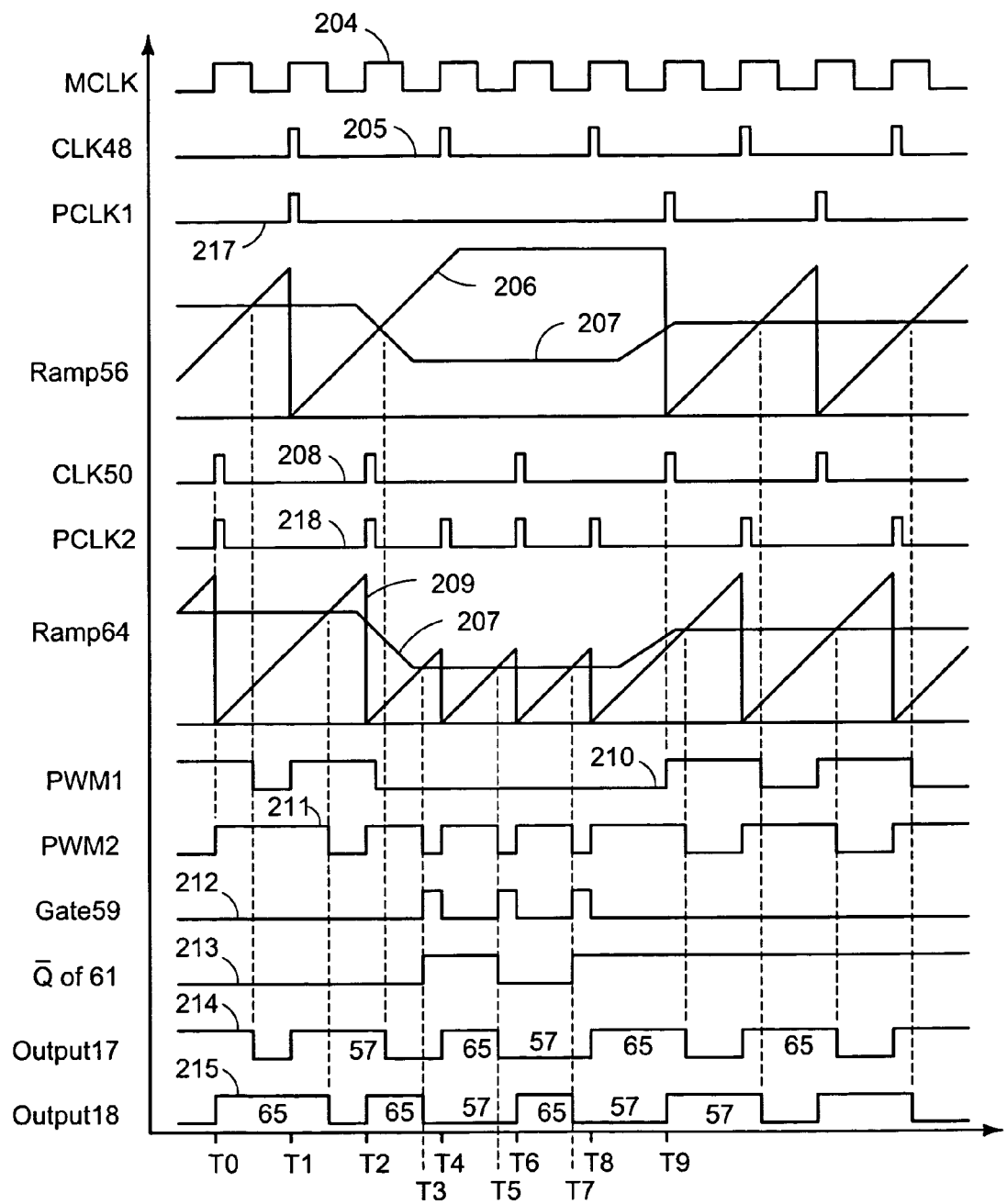
FIG. 7 is a graph having plots that illustrate signals at various points within the power supply system of FIG. 6 accordance with the present invention.

FIG. 7 is a graph having plots that illustrate some of the signals within controller 263 at various points in time. The abscissa illustrates time and the ordinate illustrates various signal levels. A plot 204 illustrates the MCLK output of master clock 47. A plot 205 illustrates the CLK48 output signal of divide by two block 48, a plot 217 illustrates the PCLK 1 output of Mux 53, a plot 206 illustrates the output of ramp 56, plot 207 represents the error voltage output of amplifier 32, a plot 208 represents the CLK50 output signal of divide by two block 50, a plot 218 illustrates the PCLK 2 output signal of Mux 62, a plot 209 illustrates the output of ramp 64, a plot 210 illustrates the PWM1 output of PWM channel 54, a plot 211 illustrates the PWM2 output of PWM channel 63, a plot 212 illustrates the output of gate 59, a plot 213 illustrates the Q bar output of flip-flop 61, a plot 214 illustrates the PWM drive signal on drive output 17, and a plot 215 represents the PWM drive signal on drive output 18.

For the example embodiment illustrated in FIG. 6, controller 263 is formed to use one PWM channel and two drive outputs under typical operating conditions, and to have the second PWM channel ready to generate a PWM control signal. When the load current demand is high, both PWM channels are used to couple PWM control signals to outputs 17 and 18 including overlapping operation of the two PWM channels. When the load current demands are lower, controller 263 senses the decreased load demand and selectively couples a single PWM control signal to different outputs of controller 263, thus, to different power stages during different time periods in order to distribute the errors and offsets of controller 263 and system 262 among the power stages. This makes the error in the power stages substantially equal. Controller 263 compares the PWM control signals (PWM1 and PWM2) on the outputs of the PWM channels in order to detect the decreased load current demand. Gate 59 compares the output of channels 54 and 63, and changes the state of flip-flop 61 when both of channels 54 and 63 are inactive. Changing the state of flip-flop 61 selectively changes the clock signals applied to ramps 56 and 64 and selectively changes the PWM control signal from channels 54 and 63 that is applied to outputs 17 and 18. As long as the active state of the outputs of channels 54 and 63 overlap, the state of flip-flop 61 is static and the PWM channels applied to the outputs 17 and 18 remain static.

Prior to time T0 and assuming that flip-flop 61 is set, the Q bar output of flip-flop 61 is low and selects the channel B input of Mux 62 to couple CLK50 to the output of Mux 62 as PCLK 2. The low from flip-flop 61 also selects the B input of Mux 53 and couples CLK48 to the output of Mux 53 as PCLK 1. At time T0, CLK50 goes high causing PCLK 2 to also go high. The high on PCLK 2 is received by ramp 64 which responsively initiates generating a ramp signal that is coupled to the input of comparator 65 as illustrated by plot 209. As long as the ramp signal is less than the error voltage from amplifier 32, the PWM2 output of comparator 65 is high as illustrated by plot 211. The low CLK48 signal of block 48 is coupled through Mux 53 to PCLK 1. Since PCLK 1 is low, ramp 56 is in a previous charging state and the PWM1 output of comparator 57 is low. The low from flip-flop 61 also selects the B input channel of output Mux 67 and selectively couples PWM2 to output 18 as illustrated by plot 215. Additionally, the low from flip-flop 61 also selects the B input channel of Mux 58 and selectively couples PWM1 to output 17 as illustrated by plot 214.

At time T1, the next rising edge of MCLK increments block 48 and drives PCLK 1 high. The high on PCLK 1 is received by ramp 56 which responsively begins a charging cycle and generates a ramp as illustrated by plot 206. The output of ramp 56 forces PWM1 high as long as the value of the ramp signal is less than the value of the error voltage. Because Mux 58 couples PWM1 to output 17, output 17 also goes high as illustrated by plot 214.

At time T2, the next rising edge of MCLK increments block 50 and forces CLK50 high. The rising edge of CLK50 is coupled through Mux 62 to PCLK 2 which initiates a ramp signal from ramp 64. The ramp signal forces PWM2 high which is selectively coupled to output 18 through output Mux 67 (plot 215). At time T3, the load current demand has decreased as indicated by plot 207. Because of the decreased load current demand, the error voltage decreases and the PWM2 output of comparator 65 goes low prior to the next rising edge of CLK48. Since both PWM1 and PWM2 are low, the output of gate 59 goes high changing the state of flip-flop 61 and forcing the Q bar output high. The high from flip-flop 61 is applied to multiplexers 53, 58, 62, and 67 and multiplexers 53, 58, 62, and 67 to responsively select input channel A instead of input channel B. Thus, Mux 53 now selects CLK50 to PCLK 1, and Mux 62 selects CLK48 to PCLK 2. Additionally, output Mux 58 selectively couples the PWM2 output of channel 63 to output 17, and Mux 67 selectively couples the PWM1 output of channel 54 to output 18. At time T4, the rising edge of MCLK increments block 48 and forces CLK48 high. Mux 62 now selectively couples CLK48 to PCLK 2, thus, the high going CLK48 is coupled to ramp 64 to initiate a ramp signal and to force PWM2 high as illustrated by plots 209 and 211. Output Mux 58 now selectively couples PWM2 to output 17 thereby forcing output 17 high as illustrated in plot 214. Mux 53 selectively couples CLK50 to PCLK 1 and ramp 56. Since CLK50 is low, ramp 56 continues the previous charging cycle and PWM1 remains low. Output Mux 67 selectively couples PWM1 to output 18 to force output 18 low as illustrated by plot 215. Since the load current demand is low and the error voltage is also low, as illustrated by plot 207, the output of comparator 65 drives PWM2 low at time T5 prior to the next rising edge of MCLK, thus, prior to the next rising edge of either PCLK 1 or PCLK 2. Since the outputs of both comparators 57 and 65 are low, the output of gate 59 once again goes high forcing the Q bar output of flip-flop 61 low.

The low from flip-flop 61 causes Mux 53 to select the B input and again couple CLK48 to PCLK 1 and causes Mux 62 to once again select the B input and couple the CLK50 to PCLK 2. The low from flip-flop 61 also causes output Muxs 58 and 67 to again select the B input and respectively selectively couple PWM1 to output 17 and PWM2 to output 18. At time T6, CLK50 goes high causing PCLK 2 to also go high. The high on PCLK 2 generates a ramp signal from ramp 64 that is coupled to the input of comparator 65 and forces PWM2 high as illustrated by plots 209 and 211. During this time, CLK48 is low. The low CLK48 is coupled through Mux 53 to PCLK 1 which leaves ramp 56 in the previous charging state and leaves PWM1, thus output 17, low.

Because of the decreased load current demand, at time T7 PWM2 goes low prior to CLK48 initiating another ramp from ramp 56. Since PWM1 and PWM2 are both low, the output of gate 59 goes high again and changes the state of flip-flop 61 by forcing the Q bar output high. The high from flip-flop 61 is applied to multiplexers 53, 58, 62, and 67 and causes multiplexers 53, 58, 62, and 67 to select input channel A instead of input channel B. Thus, Mux 53 again applies CLK50 to PCLK 1, and Mux 62 applies CLK48 to PCLK 2. Additionally, output Mux 58 selectively couples PWM2 to output 17, and output Mux 67 selectively couples PWM1 to output 18. At time T8, the rising edge of MCLK clocks block 48 and forces CLK48 high. Mux 62 couples CLK48 to PCLK 2, thus, the high going CLK48 signal is coupled to ramp 64 to initiate a ramp signal and to force PWM2 high as illustrated by plots 209 and 211. Output Mux 58 now selectively couples PWM2 to output 17 thereby forcing output 17 high as illustrated in plot 214. Mux 53 now couples CLK50 to PCLK 1 and ramp 56. Since CLK50 is low, ramp 56 continues the previous charging cycle and PWM1 remains low. Output Mux 67 selectively couples PWM1 to output 18 to force output 18 low as illustrated by plot 215.

Prior to time T9, the load current demand increases and the error voltage also increases as illustrate by plot 207. The increased error voltage causes PWM2 to remain high. At time T9, MCLK goes high forcing CLK50 high. Since the output of flip-flop 61 is still high, the high from CLK50 is selected through Mux 53 to PCLK 1 and initiates a ramp cycle within ramp 56. The ramp forces PWM1 high. Since the outputs of comparators 57 and 65 overlap, the output of gate 59 remains low so controller 263 keeps PWM1 selectively coupled to output 18 and PWM2 selectively coupled to output 17.

The sequences continue, as long as both PWM1 and PWM2 are both high or active, the assignments of PWM channels to outputs remains static, when both PWM1 and PWM2 are low, the assignments of PWM channels to outputs is selectively changed. Thus, the algorithm used to selectively couple PWM control signals to outputs is load current dependent, and changing the selection occurs during light and normal load conditions.

In order to facilitate the functionality of the embodiment illustrated in FIG. 6, the output of master clock 47 is connected to an input of block 48 and to an input of block 49. An output of block 48 is connected to a first input of multiplexers 53 and 62. An output of block 49 is connected to an input of block 50. Block 50 has an output connected to a second input of multiplexers 53 and 62. An output of Mux 53 is connected to the input of ramp 56. The output of ramp 56 is connected to the inverting input comparator 57. An output of Mux 62 is connected to the input of ramp 64. The output of ramp 64 is connected to the inverting input of comparator 65. The output of amplifier 32 is connected to the non-inverting input of comparators 57 and 65. The output of comparator 57 is commonly connected to a first input of gate 59 and to a first input of multiplexers 58 and 67. The output of comparator 65 is commonly connected to a second input of gate 59 and to a second input of multiplexers 58 and 67. An output of Mux 58 is connected to output 17, and an output of Mux 67 is connected to output 18. An output of gate 59 is connected to a clock input of flip-flop 61. A Q bar output of flip-flop 61 is commonly connected to the D input of flip-flop 61 and to a select input of multiplexers 53, 58, 62, and 67.

Figure 8:
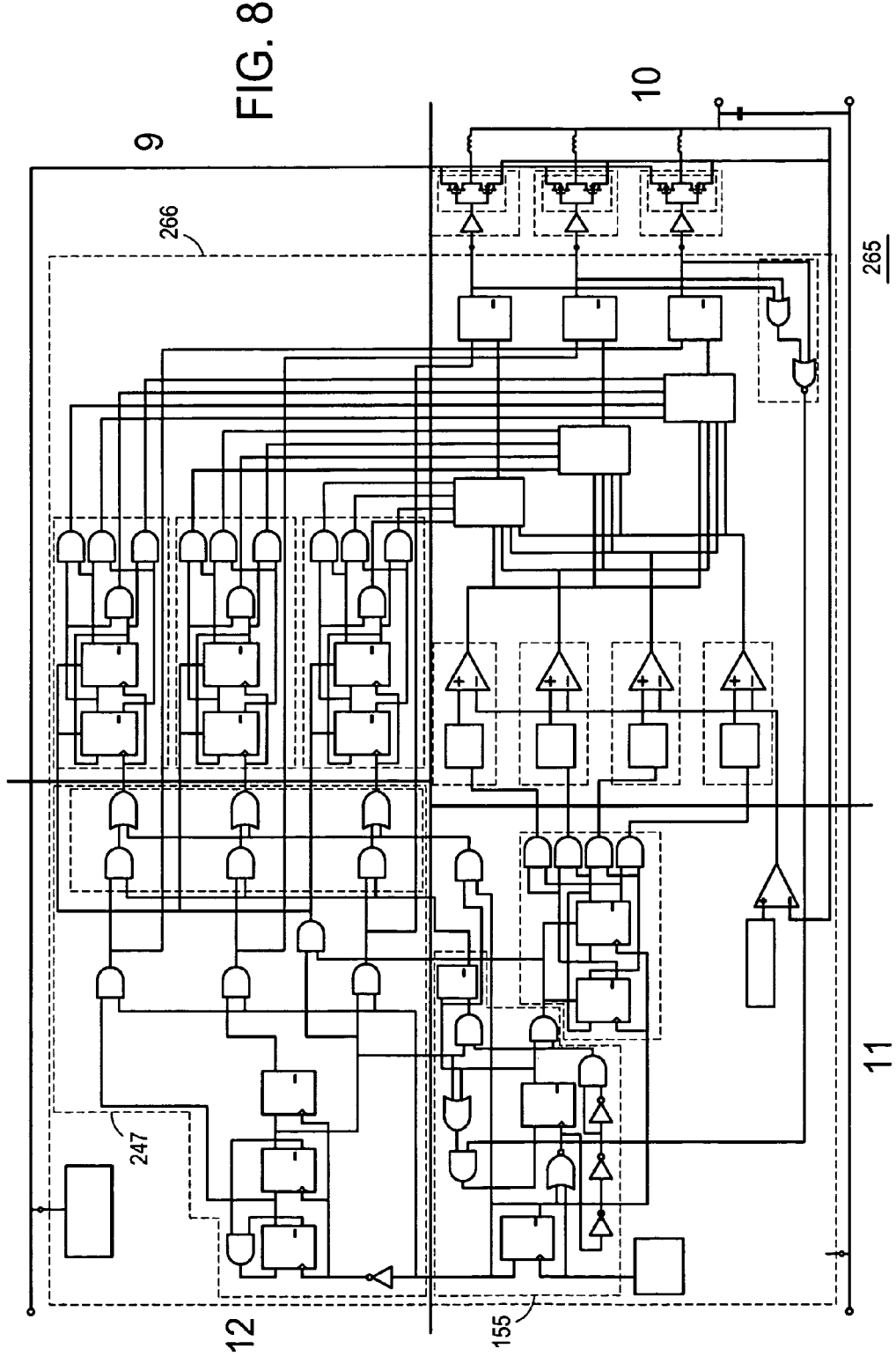
FIG. 8 schematically illustrates a block diagram view of an embodiment of a portion of a third power supply system in accordance with the present invention.
Figure 9:
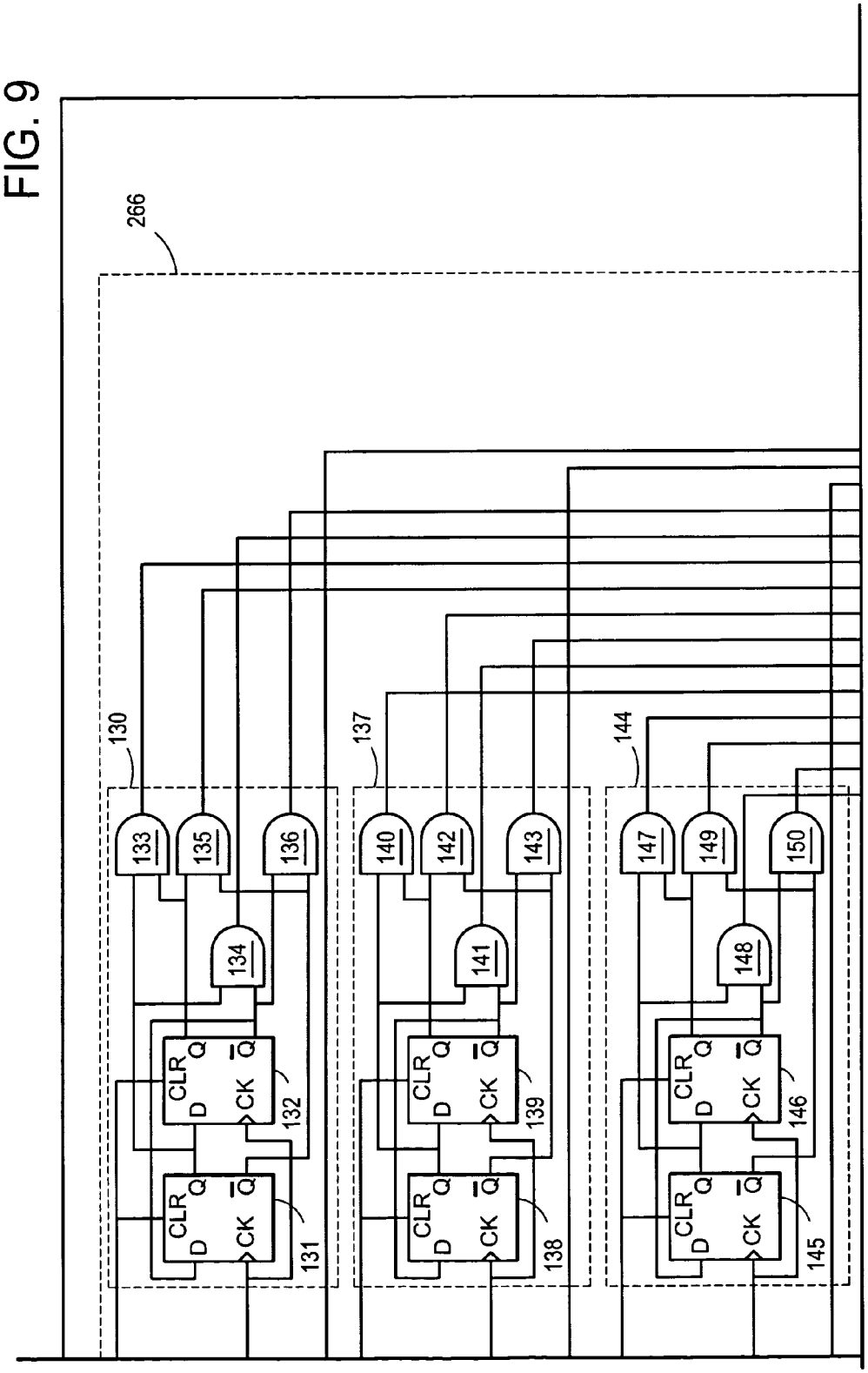
FIG. 9 through FIG. 12 schematically illustrate some details of the block diagram of the embodiment of the power supply system of FIG. 8 in accordance with the present invention.
Figure 10:
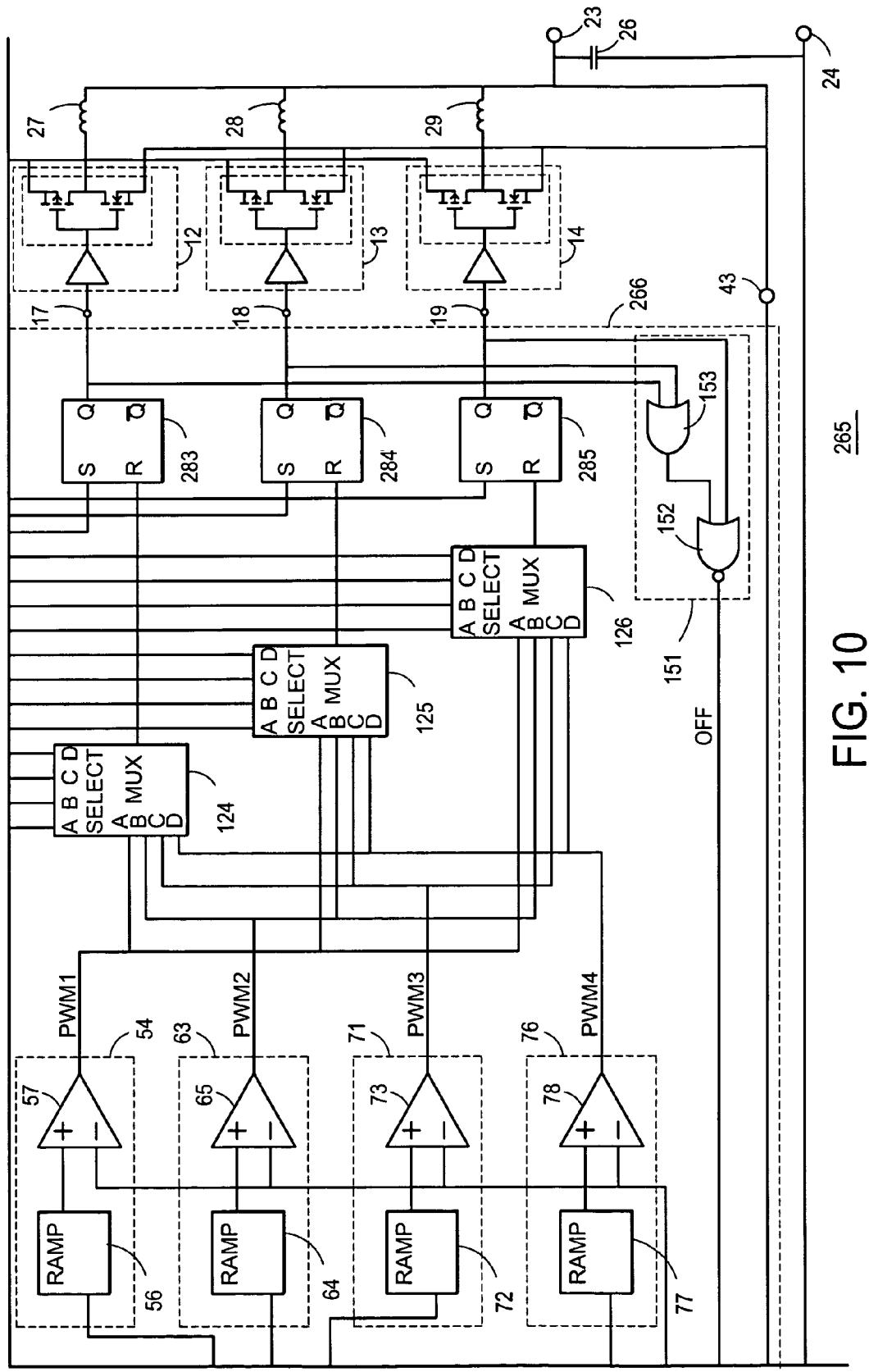
Figure 11:
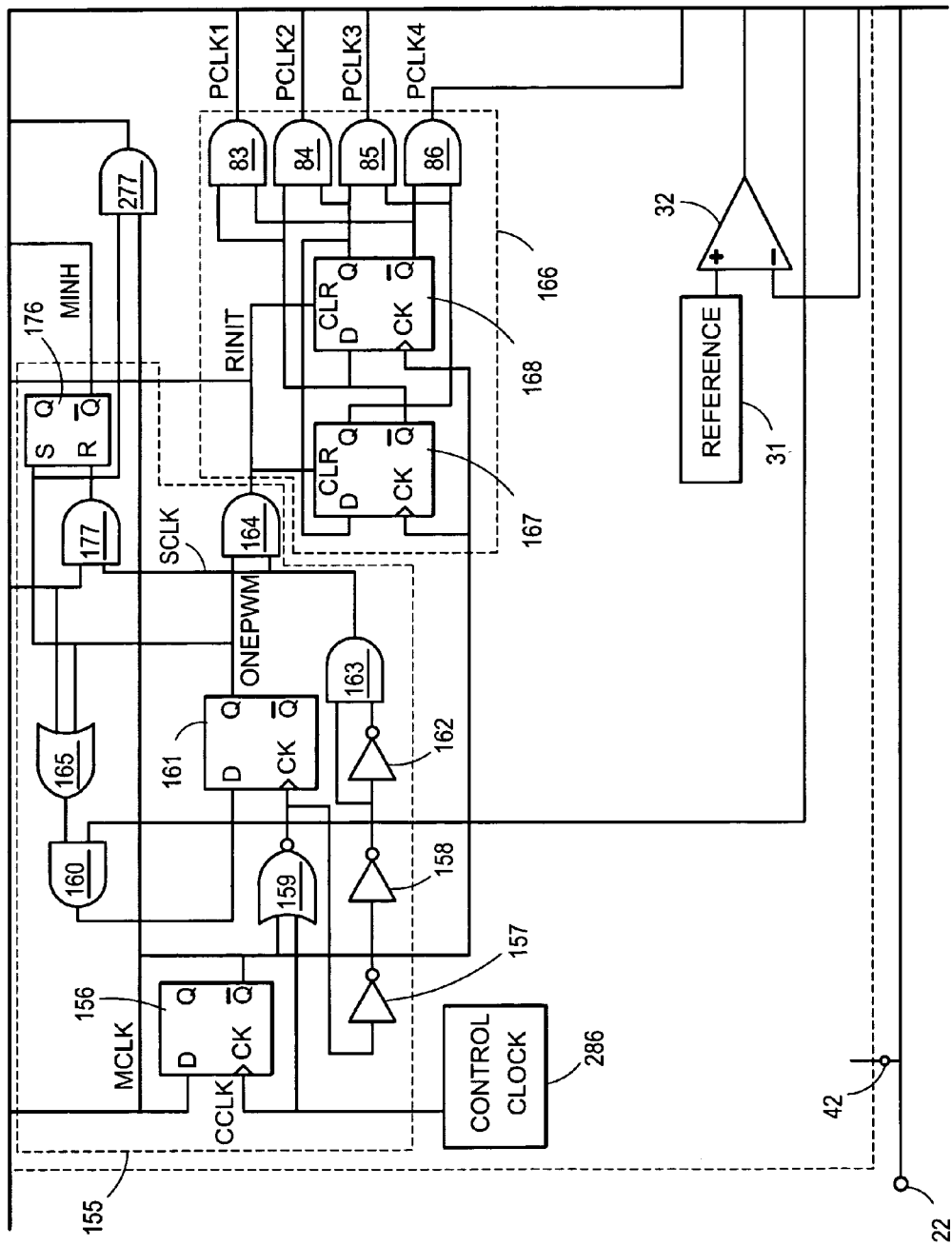
Figure 12:
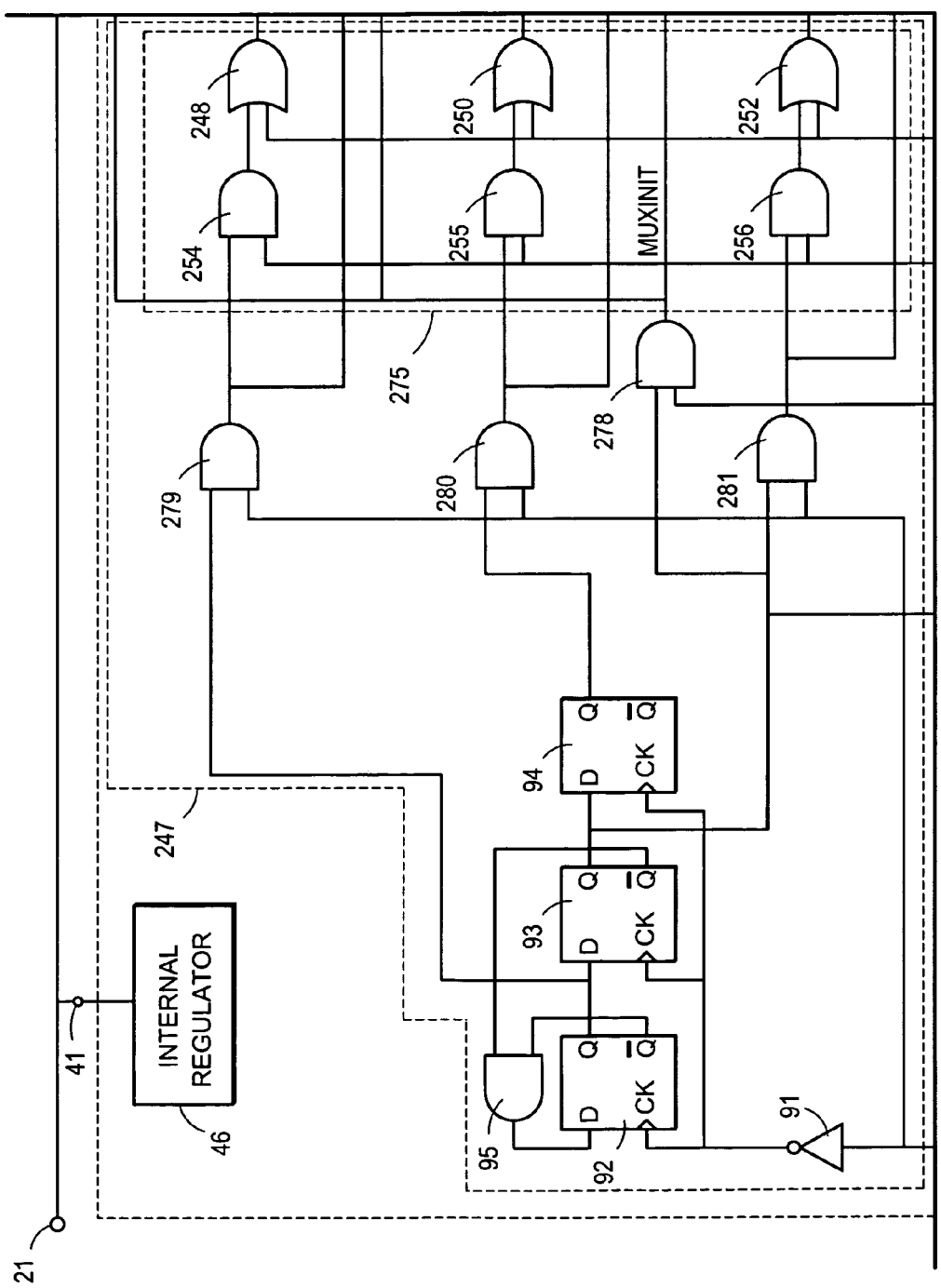

FIG. 8 schematically illustrates a block diagram view of an embodiment of a portion of a power supply system 265 that is an alternate embodiment of system 260 explained in the descriptions of FIGS. 1–4 and FIG. 5 and an alternate embodiment of system 262 explained in the descriptions of FIG. 6 and FIG. 7.

FIG. 9 through FIG. 12 schematically illustrate some details of the block diagram of the embodiment of system 265 illustrated in FIG. 8. The block diagram of FIG. 8 illustrates the relative positional relationships between FIGS. 9–12. This description has references to FIG. 8 through FIG. 12. Power supply system 265 has a power supply controller 266 that includes a plurality of PWM control channels that generate a plurality of PWM control signals, and also includes a plurality of drive outputs. Controller 266 is an alternate embodiment of controller 70 that was explained in the description of FIGS. 1–5 and an alternate embodiment of controller 263 that was explained in the description of FIGS. 6–7. Controller 266 selectively couples different PWM control signals to the outputs of controller 266 for different time periods to facilitate selectively driving different power switches of system 265 with the different PWM control signals. Controller 266 is formed to selectively couple some of the plurality of PWM control signals to the plurality of outputs during different time periods. Selectively assigning a different PWM control signal to at least a portion of the outputs during different time periods assists in distributing among all of the outputs of controller 266 the errors or offsets that are associated with the different portions of controller 266 and system 265. Thus, the errors or offsets are distributed among all of the phases generated by system 265. The specific algorithm used to control the selection of the PWM channels and the specific time periods may be one of many different algorithms. For the embodiment illustrated in FIGS. 8–12, controller 266 is formed to selectively couple three of the four PWM control signals from the plurality of PWM channels to the three drive outputs, outputs 17, 18, and 19, during a first time period, and to selectively change the assignment of PWM control signals to the outputs for subsequent different time periods. In order to accomplish the changing of the assignments, controller 266 implements an algorithm that sequentially rotates the drive outputs through the four PWM control signals generated by controller 266. Thus, controller 266 selectively changes the distribution of the assignment of the plurality of outputs among the plurality of PWM control signals for different time periods. Other embodiments of system 265 and controller 266 can use different selection algorithms. The specific logic and partitioning illustrated for the embodiment of controller 266 illustrated in FIGS. 8–12 is one example of an algorithm and associated control logic that provides the function of selectively coupling different PWM control signals to the drive outputs of controller 266 for different time periods and distributing errors of the different elements of controller 266 among each of the outputs of controller 266 and among the phases of system 265. Controller 266 implements the above described algorithm operation when the load current demand is high. When the load current demands are lower, controller 266 detects the decreased load demand and selectively couples a single PWM control signal to the drive outputs of controller 266 during different time periods in order to distribute the errors and offsets of controller 266 and system 265 among the power stages. Since only one PWM control signal is used, there is only one error, and this makes the error equal in all drive outputs. This is referred to as the OnePWM mode. Operation in the OnePWM mode makes the error in the power stages substantially equal. The specific logic and partitioning illustrated for the embodiment of controller 266 illustrated in FIGS. 8–12 is one example of an algorithm and associated control logic that provides the function of selectively coupling a smaller number of PWM control signals to the drive outputs of controller 266 when load demand is static, or low.

In order to provide the selective assigning of the PWM control signals to the outputs, controller 266 includes a PWM phasing generator or phase generator 166, a multiplexer clock generator or multiplexer clock or Mux clock 247, a plurality of multiplexer logic channels including multiplexer logic channels or Mux logic channels 130, 137, and 144, a first PWM latch 283, a second PWM latch 284, and a third PWM latch 285. Controller 266 is also formed to include an overlap detector 151, an overlap transition controller 275, a control clock 286 that generates a high-frequency clock, and a clock timing block 155 that receives the control clock (CCLK) output of clock 286 and assists in generating the different timing and phasing that will be explained further hereinafter.

Clock timing block 155 includes D-type flip-flops 156 and 161, an R-S latch 176, AND gates 160, 163 164, and 177, NOR gate 159, OR gate 165, and inverters 157, 158, and 162. Clock timing block 155 receives the control clock signal (CCLK) from clock 286 and utilizes CCLK to form various timing control signals to control the operation of controller 266. Flip-flop 156 divides CCLK by two to form the master clock signal (MCLK) that functions similarly to MCLK that was explained in the description of FIGS. 1–5. Inverters 157, 158, and 162, along with NOR gate 159 and AND gate 163 are utilized to form an S clock signal (SCLK) on the output of gate 163 that is utilized for initializing the state of phase generator 166, and Mux logic channels 130, 137, and 144. SCLK has a frequency that is approximately equal to the frequency of MCLK but has a narrow pulse width that is formed by an edge detector configuration of inverter 162 and gate 163. NOR gate 159 receives both CCLK and MCLK in order to form a narrow pulse that has a width of approximately equal to one-half of the cycle time of CCLK whenever MCLK is low. The frequency of the pulse is approximately equal to the frequency of MCLK. The output of gate 159 clocks the high state of the output of detector 151 into flip-flop 161, through gate 160, if the Q output of flip-flop 93 is high, and the low state of the output of detector 151 into flip-flop 161 regardless of the state of flip-flop 93, in order to form the OnePWM signal on the Q output of flip-flop 161. As described hereinbefore, the OnePWM signal is used to control the operation of controller 266 during light load conditions.

Phase generator 166 includes AND gates 83–86 in addition to D-type flip-flops 167 and 168 that facilitate forming clock signals to operate PWM channels 54, 63, 71, and 76 similarly to phase generator 80 illustrated in FIGS. 1–4. However, flip-flops 167 and 168 have a reset input that is controlled by clock timing block 155 in order to control operation during the OnePWM mode as will be seen further hereinafter. Latches 283, 284, and 285 facilitate starting the active state of the output drive signals at different times when using the same PWM channel in the OnePWM mode. Since latches 283–285 are set by outputs of Mux clock 247, and are reset by the output of PWM channels 54, 63, 71, and 76 through Muxs 124–126, latches 283–285 facilitate implementing trailing edge modulation, although the same approach could be used to implement leading edge modulation. It should be noted that the connections to the inverting and non-inverting inputs of comparators 57, 65, 73, and 78 are reversed with respect to FIG. 1 in order to facilitate the operation of latches 283–285.

Mux clock 247 along with Mux logic channels 130, 137, and 144 are formed to control the select inputs to multiplexers 124, 125, and 126 in order to facilitate selectively coupling the PWM control signals to the drive outputs of controller 266. Phase generator 166 along with Mux clock 247, clock timing block 155, and Mux logic channels 130, 137, and 144 assist in controlling the time periods. Mux clock 247 is similar to Mux clock 90 of FIGS. 1–4, however, the outputs of Mux clock 247 are modified by overlap transition controller 275 that assists in controlling the clocking of Mux logic channels 130, 137, and 144. Controller 275 includes OR gates 248, 250, and 252, and AND gates 254, 255, 256. Mux clock 247 includes inverter 91, AND gate 95, D-type flip-flops 92, 93, and 94 that function similarly as explained in the description of FIGS. 1–5 and OR gates 248, 250, and 252 that assist in controlling the time when MCLK is enabled to clock respective Mux logic channels 130, 137, and 144 during and immediately after the OnePWM mode. Mux logic channels 130, 137, and 144 are similar to Mux logic channels 101, 109, and 116 of FIGS. 1–4 but Mux logic channels 130, 137, and 144 are configured to be reset by clock timing block 155, through AND gate 278 in order to control operation during the OnePWM Mode. Mux logic channel 130 includes D-type flip-flops 131 and 132 and a plurality of AND gates including AND gates 133, 134, 135, and 136 that are formed to generate select signals for Mux 126. Mux logic channel 137 includes D-type flip-flops 138 and 139, and a plurality of AND gates 140, 141, 142, and 143 that are formed to generate select signals that are applied to Mux 125. Similarly, Mux logic channel 144 includes D-type flip-flops 145 and 146 and a plurality of AND gates including AND gates 147, 148, 149, and 150 that are formed to generate select signals for Mux 124. Each set of flip-flops 131 and 132, 138 and 139, and 145 and 146 form counters that control the selection of which PWM control signal is coupled to drive outputs 17–19 by respective channels 130, 137, and 144.

Figure 13:
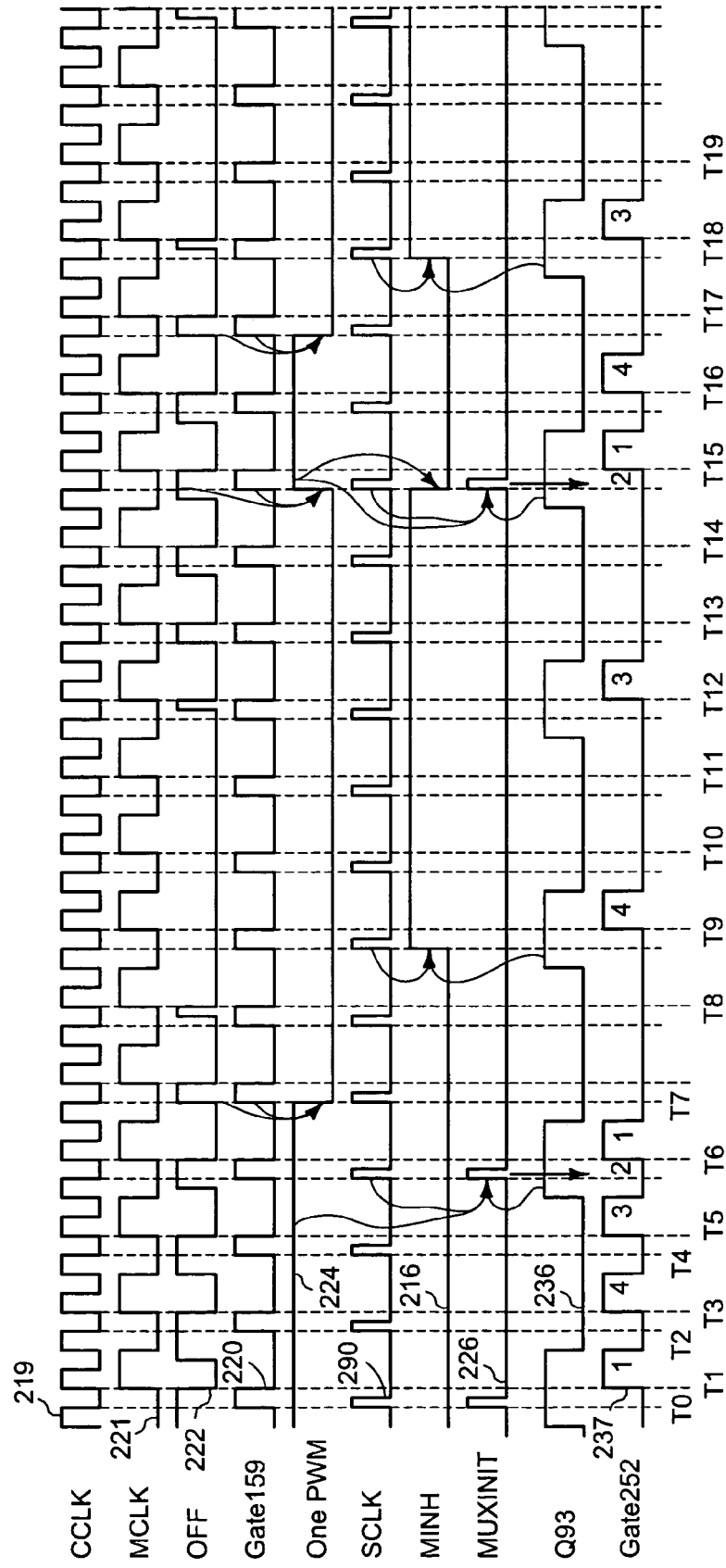
FIG. 13 through FIG. 15 are graphs having plots that illustrate signals at various points within the power supply system of FIG. 8 and FIGS. 9–12 in accordance with the present invention.
Figure 14:
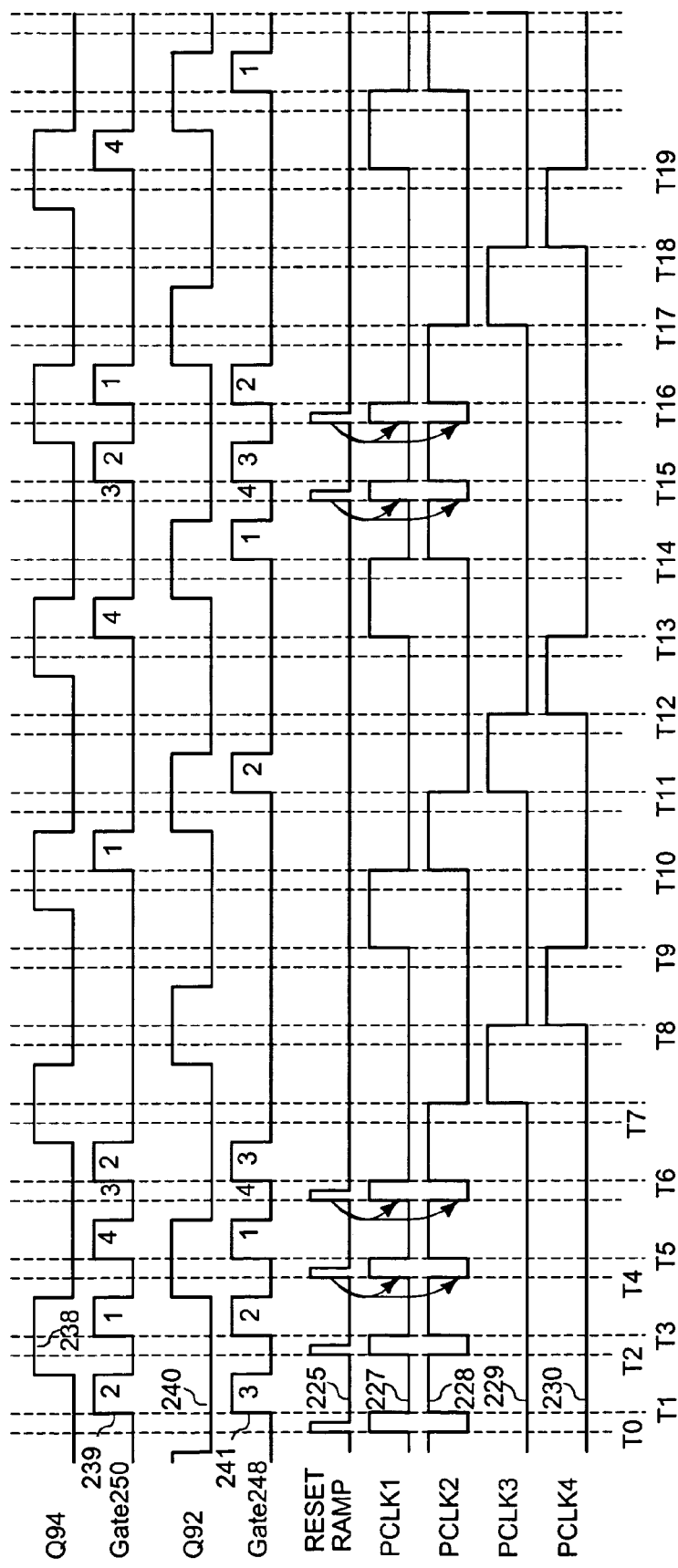
Figure 15:
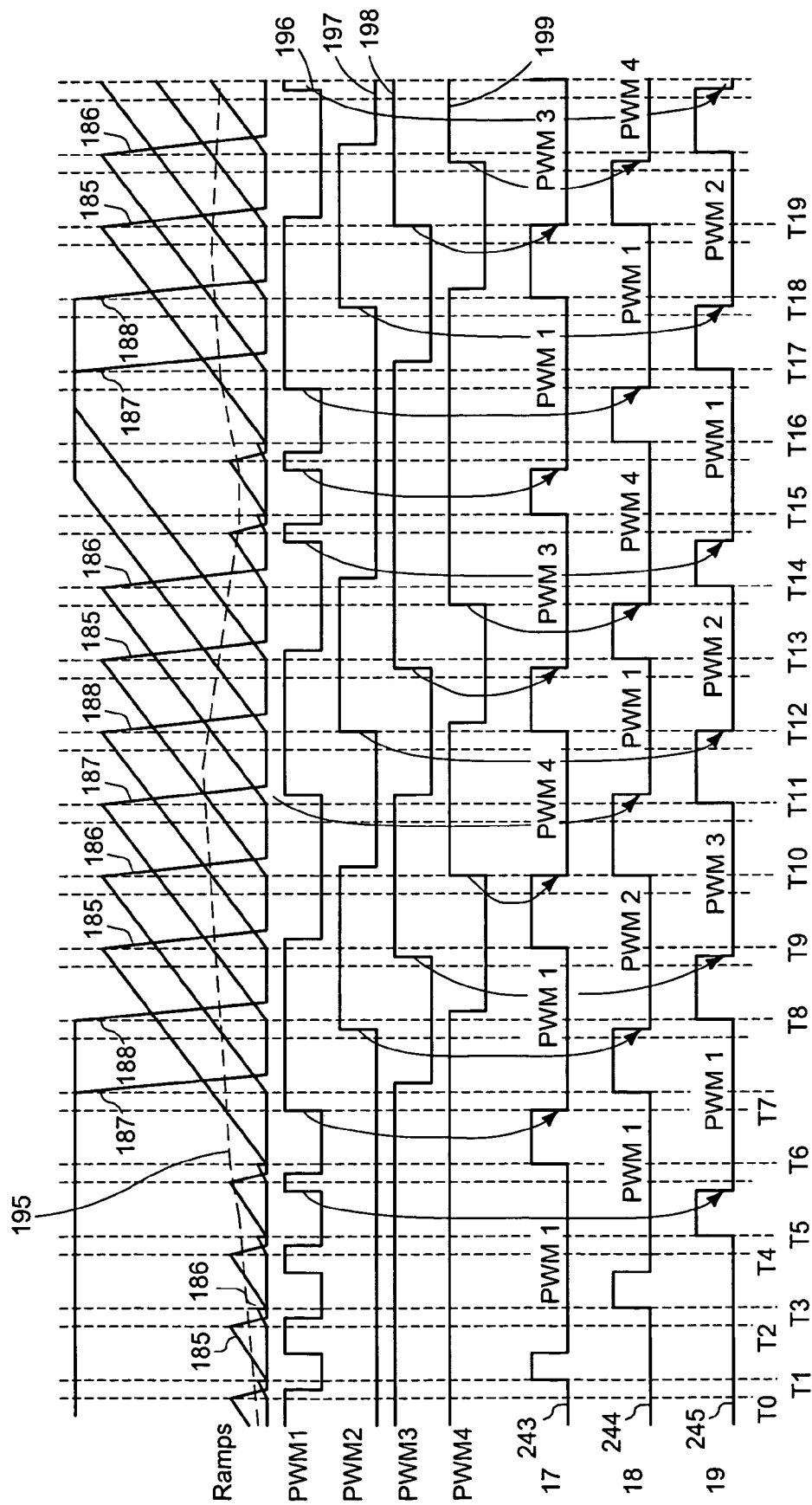

FIGS. 13–15 are graphs having plots that illustrate some of the signals within controller 266 at various points in time. The plots appear on three graphs to provide sufficient spacing to view the graphs for clarity of the drawings. The abscissa illustrates time and the ordinate illustrates various signal levels. A plot 219 illustrates the CCLK output signal from clock 286, a plot 221 illustrates the MCLK output of flip-flop 156. A plot 220 illustrates the output of gate 159, a plot 222 illustrates the OFF output signal of detector 151, a plot 224 illustrates the OnePWM output signal from flip-flop 161, a plot 290 illustrates the SCLK signal on the output of gate 163, a plot 216 illustrates a MINH signal generated on the Q bar output of latch 176, a plot 226 illustrates a MUXINIT signal generated on the output of gate 278, a plot 225 illustrates a RINIT output signal of gate 164, a plot 227 illustrates PCLK 1, a plot 228 illustrates PCLK 2, a plot 229 illustrates PCLK 3, and a plot 230 illustrates PCLK 4. Plots 185, 186, 187, and 188 illustrate the respective ramp signals generated by respective ramps 56, 64, 72, and 77, and plot 195 illustrates the error voltage. Plots 196, 197, 198, and 199 illustrate the respective PWM1, PWM2, PWM3, and PWM4 control signals on the outputs of PWM channels 54, 63, 71, and 76. Plots 236, 238, and 240 illustrate the respective enable signals generated by the Q outputs of flip-flops 93, 94, and 92 of Mux clock 247. Plots 237, 239, and 241 illustrate the respective clock signals generated by the outputs of gates 252, 250, and 248. Plots 243, 244, and 245 illustrate the respective drive signals on drive outputs 17, 18, and 19 of controller 266.

During light load conditions, the duty cycle of PWM channels 54, 63, 71, and 76 decreases until at some point the Q output of output latches 283, 284, and 285 are all low. An OR gate 153 and a NOR gate 152 of detector 151 detects the all low output condition which forces the output of gate 152 high. When the Q output of flip-flop 93 becomes high, the high from detector 151 is latched into flip-flop 161 by the output of gate 159 to start the OnePWM mode as illustrated by plot 224 at a time prior to a time T0, and at time T15. In the OnePWM mode, controller 266 uses the PWM control signal from one of PWM channels 54, 63, 71, or 66 to drive each of outputs 17–19. In order to implement this algorithm, the OnePWM signal is used to control Mux logic channels 130, 137, and 144 to select the same PWM channel for every cycle as long as the OnePWM signal is active. The OnePWM signal enables the flip-flops of channels 130, 137, and 144 to be repeatedly reset whenever the Q output of flip-flop 93 is high. When channel 130 resets, it selects PWM4, when channel 137 resets, it selects PWM3, and when channel 144 resets, it selects PWM2 so that the channels will select the proper sequence of PWM channels should the OnePWM signal go low, indicating overlap, and the need for simultaneous use of more than one PWM channel. As long as the OnePWM signal remains high, the states of Mux logic channels 130, 137, and 144 select PWM1 when the corresponding output of latches 283, 284, and 285 become set, since in the OnePWM mode MCLK is fed to the clock inputs of all Mux logic channels by gates 277, 248, 250 and 252. Also in the OnePWM mode, the RINIT signal repeatedly resets flip-flops 167 and 168 to cause phase generator 166 to repeatedly initiate a ramp generation in the same PWM channel that is selected by Mux logic channels 130, 137, and 144.

Previous to time T0, a light load condition is detected and the output of detector 151 as the off signal (OFF) goes high. OFF is clocked into flip-flop 161 when the Q output of flip-flop 93 is high as described hereinbefore which forces OnePWM high, as indicated by plot 224, to reset flip-flops 167–168, 131–132, 138–139, and 145–146. The high OnePWM signal sets latch 176. The output of latch 176 drives the output of gates 254, 255, and 256 low in order to block MCLK from affecting channels 130, 137, and 144. Consequently, the output of gate 136 of channel 130 is high so that Mux 126 couples the output of PWM 4 to the reset input of latch 285. Similarly, the output of gate 143 of channel 137 is high so Mux 125 couples the output of PWM 3 to the reset input of latch 284. Also, the output of gate 150 of channel 144 is high so Mux 124 couples the output of PWM 2 to the reset input of latch 283. During the OnePWM mode, the state of flip-flops 92–94 continues to control the steering of MCLK to sequentially set latches 283, 284, and 285 based on the Q output of respective flip-flops 93, 94, and 92.

At time T0, and also just prior to time T15, the trailing edge of CCLK forces RINIT high, as illustrated by plot 225, to clear flip-flops 167 and 168 which forces PCLK 1 high as illustrated by plot 227. As explained in the description of FIGS. 1–5, forcing PCLK 1 high prepares PWM channel 54 to generate a ramp signal to correspondingly cause transitions of PWM 1 relative to the value of the error voltage as illustrated by plot 195.

At times T1, and T15, flip-flop 93 has been set, enabling the rising edge of MCLK to set latch 283 through gate 281. MCLK also clocks all Mux logic channels to select the next lower number PWM channel, setting channel 144 to PWM1, and clocks flip-flops 167–168 to initiate ramp 56. At a time T2, the output of ramp 56 and the error voltage coincide, forcing PWM 1 high as indicated by plot 196. The high from PWM 1 resets latch 283 as illustrated by plot 243. Subsequently, the trailing edge of MCLK changes the state of flip-flops 92–94 forcing the output of flip-flop 93 low and the output of flip-flop 94 high as illustrated by plots 236 and 238. The high from the output of flip-flop 94 enables gate 280 to allow the next rising edge of MCLK to set latch 284 at a time T3 as illustrated by plot 244. Since Mux logic channel 137 also receives MCLK, it has received two MCLK rising edges since being reset, and selects PWM 1. The next rising edge of PWM 1 at a time T4 resets latch 284 through Mux 125 forcing output 18 low as illustrated by plot 244. The next falling edge of MCLK changes the state of flip-flops 92–94 to set flip-flop 92, clear flip-flop 94, and leave flip-flop 93 cleared. The high Q output of flip-flop 92 enables gate 279 to allow the next rising edge of MCLK to set latch 285. Since Mux logic channel 130 also receives MCLK, it has received three MCLK rising edges since being reset, and selects PWM 1. The next rising edge of PWM 1 just subsequent to time T4 resets latch 285 through Mux 126 forcing output 19 low as illustrated by plot 245.

This algorithm of steering MCLK to sequentially set latches 283, 284, and 285 and steering the PWM 1 output of channel 54 to reset latches 283–285 as a function of the error voltage continues as long as OnePWM is active. Each rising edge of Gate 159 stores the state of OFF into flip-flop 161. As illustrated by plot 222, in the OnePWM mode, OFF transitions between active and inactive as a function of outputs 17, 18, and 19. At a time T7, OFF is inactive when flip-flop 161 is clocked, thereby forcing OnePWM low and disabling the OnePWM mode as illustrated by plot 224. When the OnePWM signal goes low, gates 254, 255, 256, and 277 are used to block MCLK from changing the state of the Mux logic channels. During the transition from the OnePWM mode to the full rotation mode explained in the description of FIGS. 1–5, the state of Mux logic channels 130, 137, and 144 do not change since MCLK can no longer get to the Mux logic through gates 254, 255, and 256, and a high Q output of flip-flop 93 is needed before an SCLK reset of latch 176 allows MCLK through gates 254–256. Prior to T6 the Q output of flip-flop 93 and the OnePWM signal are both high and SCLK resets Mux logic channel 137 to cause MUX 125 to select PWM 3. At time T6 one MCLK rising edge through gate 277 changes Mux logic channel 137 to cause MUX 125 to select PWM 2. At time T7, the Q output of flip-flop 94 is high which enables gate 280 to allow MCLK to set latch 284, and the high output of Mux logic gate 141 causes Mux 125 to select channel B to couple PWM 2 of channel 63 to the reset input of latch 284. Since the Q output of latch 161 is low, RINIT no longer clears the counter of flip-flops 167 and 168, thus, the rising edge of MCLK after T7 also increments the phase generator counter by setting flip-flop 167 forcing PCLK 2 low to initiate a ramp generation cycle within channel 63. Thus, channel 63 is now also active and the output is coupled to the reset input of latch 284 through MUX 125. The next falling edge of MCLK changes flip-flops 92–94 by clearing flip-flop 94 and setting flip-flop 92. The high Q output of flip-flop 92 enables gate 279 to couple MCLK to the set input of latch 285 thereby setting latch 285. Mux logic channel 130 continues to select PWM 3, having received one MCLK rising edge since the previous reset set it to select PWM4. The next falling edge of MCLK increments flip-flops 92–94 to set flip-flop 93 and clear flip-flop 92. The high Q output of flip-flop 93 enables gate 177 to couple SCLK to the reset input of latch 176. At a time T9, MCLK goes high which sets latch 283 and also increments the counters of channel 144 by setting flip-flop 146. The high on the Q output of flip-flop 146 forces the output of gate 147 high enabling the select D input of Mux 124 to couple PWM 4 of channel 76 to the reset input of latch 283. After time T9 and as long as the OFF output of detector 151 remains low, controller 266 operates similarly to controller 70 that was explained in the description of FIGS. 1–5. In the event that OFF and Q93 are high upon the rising edge of the output of gate 159, controller 266 reverts to the OnePWM mode as explained hereinbefore.

For the example embodiment illustrated in FIGS. 8–12, control clock 286 has an output commonly connected to a first input of gate 159, and a clock input of flip-flop 156. A Q bar output of flip-flop 156 is commonly connected to a second input of gate 159, a D input of flip-flop 156, an input of inverter 91, a clock input of flip-flops 167 and 168, and a first input of an AND gate 277. An output of gate 159 is commonly connected to a clock input of flip-flop 161, and an input of inverter 157. An output of inverter 157 is connected to an input of inverter 158. An output of inverter 158 is commonly connected to a first input of gate 163, and an input of inverter 162. An output of inverter 162 is connected to a second input of gate 163. A Q output of flip-flop 161 is connected to a first input of gate 164, a set input of latch 176, a first input of gate 165, and a second input of gate 277. An output of gate 165 is connected to a first input of gate 160. An output of gate 160 is connected to the D input of flip-flop 161. An output of gate 163 is connected to a second input of gate 164, and a first input of gate 177. An output of gate 164 is connected to a clear input of flip-flops 167 and 168, and a first input of gate 278. An output of inverter 91 is connected to a clock input of flip-flops 92, 93, and 94. A Q output of flip-flop 92 is connected to a D input of flip-flop 93 and to a first input of gate 279. A Q bar output of flip-flop 92 is connected to a first input of gate 95. A Q output of flip-flop 93 is connected to a D input of flip-flop 94, to a first input of gate 281, and to a second input of gates 165, 177, and 278. A Q bar output of flip-flop 93 is connected to a second input of gate 95. An output of gate 95 is connected to a D input of flip-flop 92. A Q output of flip-flop 94 is connected to a first input of gate 280. A second input of gates 279, 280, and 281 are commonly connected to the Q bar output of flip-flop 156. An output of gate 279 is connected to a first input of gate 254 and to the set input of latch 285. An output of gate 280 is connected to a set input of latch 284 and to a first input of gate 255. An output of gate 281 is connected to a set input of latch 283 and to a first input of gate 256. A second input of gates 254, 255, and 256 are commonly connected to a Q bar output of latch 176. An output of gate 254 is connected to a first input of gate 248. An output of gate 255 is connected to a first input of gate 250. An output of gate 256 is connected to a first input of gate 252. A second input of gates 248, 250, and 252 are commonly connected to an output of gate 277. An output of gate 248 is connected to a clock input of flip-flops 131 and 132. An output of gate 250 is connected to a clock input of flip-flops 138 and 139. An output of gate 252 is connected to a clock input of flip-flops 145 and 146. An output of gate 278 is connected to clear inputs of flip-flops 131, 132, 138, 139, 145, and 146. A Q output of flip-flop 145 is connected to a D input of flip-flop 146 and to a first input of gates 147 and 148. A Q bar output of flip-flop 145 is connected to a first input of gates 149 and 150. A Q output of flip-flop 146 is connected to a second input of gates 147 and 149. A Q bar output of flip-flop 146 is connected to a D input of flip-flop 145 and to a second input of gates 148 and 150. An output of gate 148 is connected to a first select input of multiplexer 124. An output of gate 150 is connected to a second select input of multiplexer 124. An output of gate 149 is connected to a third select input of multiplexer 124, and an output of gate 147 is connected to a fourth select input of multiplexer 124. A Q output of flip-flop 138 is connected to a D input of flip-flop 139 and to a first input of gates 140 and 141. A Q bar output of flip-flop 138 is connected to a first input of gates 142 and 143. A Q output of flip-flop 139 is connected to a second input of gates 140 and 142. A Q bar output of flip-flop 139 is connected to a D input of flip-flop 138 and to a second input of gates 141 and 143. An output of gate 140 is connected to a first select input of multiplexer 125. An output of gate 141 is connected to a second select input of multiplexer 125. An output of gate 143 is connected to a third select input of multiplexer 125. An output of gate 142 is connected to a fourth select input of multiplexer 125. A Q output of flip-flop 131 is connected to a D input of flip-flop 132 and to a first input of gates 133 and 134. A Q bar output of flip-flop 131 is connected to a first input of gates 135 and 136. A Q output of flip-flop 132 is connected to a second input of gates 133 and 135. A Q bar output of flip-flop 132 is connected to a D input of flip-flop 131 and to a second input of gates 134 and 136. An output of gate 135 is connected to a first select input of multiplexer 126. An output of gate 133 is connected to a second select input of multiplexer 126. An output of gate 134 is connected to a third select input of multiplexer 126. An output of gate 136 is connected to a fourth select input of multiplexer 126. An output of multiplexer 124 is connected to a reset input of latch 283. A Q output of latch 283 is connected to output 17 and to a first input of gate 153. An output of multiplexer 125 is connected to a reset input of latch 284. A Q output of latch 284 is connected to output 18 and to a second input of gate 153. An output of multiplexer 126 is connected to a reset input of latch 285. A Q output of latch 285 is connected to output 19 into a first input the gate 152. A second input of gate 152 is connected to an output of gate 153. An output of gate 152 is connected to a second input of gate 160.

FIG. 16 schematically illustrates an enlarged plan view of a portion of an embodiment of a semiconductor device 300 that is formed on a semiconductor die 301. Controller 70 is formed on die 301. Die 301 may also include other circuits that are not shown in FIGS. 1–4 for simplicity of the drawing. Controller 70 and device 300 are formed on die 301 by semiconductor manufacturing techniques that are well known to those skilled in the art. As will be apparent to those skilled in the art, controller 263 or 266 may be formed on die 301 instead of controller 70.

In view of all of the above, it is evident that a novel device and method is disclosed. Included, among other features, is forming a power supply controller that is configured to selectively rotate PWM control signals from a plurality of PWM controllers among a plurality of outputs. Using different PWM control signals during different time periods spreads the errors of the different PWM control loops over all of the outputs of the power supply controller and improves system operation.

While the invention is described with specific preferred embodiments, it is evident that many alternatives and variations will be apparent to those skilled in the semiconductor arts. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. A method of forming a power controller comprising:
    forming the power controller to include at least a first PWM controller, a second PWM controller, a first PWM output operable for coupling to a first power stage, and a second PWM output operable for coupling to a second power stage;
    configuring the power controller to selectively use a first PWM control signal from the first PWM controller to control a first PWM drive signal on the first PWM output for a first time period; and
    configuring the power controller to selectively use the first PWM control signal from the first PWM controller to control a second PWM drive signal on the second PWM output for a second time period.

2. The method of claim 1 wherein configuring the power controller to selectively use the first PWM control signal from the first PWM controller to control the first PWM drive signal on the first PWM output for the first time period includes configuring the power controller to selectively use a second PWM control signal from the second PWM controller to control the second PWM drive signal on the second PWM output.

3. The method of claim 1 wherein configuring the power controller to selectively use the first PWM control signal from the first PWM controller to control the second PWM drive signal on the second PWM output for the second time period includes configuring the power controller to selectively use a second PWM control signal from the second PWM controller to control the second PWM drive signal on the first PWM output.

4. The method of claim 1 wherein forming the power controller to include at least the first PWM controller, the second PWM controller, and the first PWM output includes configuring the power controller to include more PWM controllers than PWM outputs.

5. The method of claim 1 further including configuring the power controller to selectively use a second PWM control signal from the second PWM controller to control the second PWM drive signal on the first PWM output during a third time period and to use a third PWM control signal from a third PWM controller to control a third PWM drive signal on a third PWM output during a fourth time period.

6. The method of claim 5 further including configuring the power controller to form the third time period and the fourth time period between the first time period and the second time-period.

7. The method of claim 5 further including configuring the power controller to form the third time period after the second time period and the fourth time period after the third time period.

8. A method of controlling a power supply comprising:
    using a first PWM control signal from a first PWM controller to control a first power switch of the power supply for a first time period;
    using a second PWM control signal from a second PWM controller to control a second power switch of the power supply; and
    using the first PWM control signal from the first PWM controller to control the second power switch for a second time period.

9. The method of claim 8 wherein using the second PWM signal from the second PWM controller to control the second power switch includes using the second PWM control signal from the second PWM controller to control the second power switch after the first time period.

10. The method of claim 8 wherein using the first PWM control signal from the first PWM controller to control the second power switch for the second time period includes using the second PWM control signal from the second PWM controller to control a third power switch for a third time period that is after the second time period.

11. The method of claim 10 further including using a third PWM control signal from a third PWM controller to control the first power switch for a third time period that is after the second time period.

12. The method of claim 8 wherein using the first PWM control signal from the first PWM controller to control the second power switch for the second time period includes using the second PWM control signal from the second PWM controller to control the first power switch after the second time period.

13. The method of claim 8 further including using a first plurality of power switches and a second plurality of PWM control signals wherein the second plurality is larger than the first plurality, and periodically selecting a PWM control signal of the second plurality of PWM control signals to couple to a power switch of the first plurality of power switches.

14. A power supply controller comprising:
a first plurality of PWM drive outputs;
a second plurality of PWM controllers, each PWM controller operable to generate a PWM control signal; and
a control circuit operable to selectively couple a first PWM control signal to control a first PWM drive output of the first plurality of PWM drive outputs during a first time period and to couple the first PWM control signal to control a second PWM drive output of the first plurality of PWM drive outputs during a second time period.

15. The power supply controller of claim 14 further including the control circuit operable to selectively couple a second PWM control signal to control the second PWM drive output of the first plurality of PWM drive outputs during a third time period and to couple a third PWM control signal to control a third PWM drive output of the first plurality of PWM drive outputs during a fourth time period.

16. The power supply controller of claim 15 wherein the third time period occurs after the second time period and the fourth time period occurs after the third time period.

17. The power supply controller of claim 15 wherein the third time period and the fourth time period occur between the first time period and the second time period.

18. The power supply controller of claim 15 wherein the second plurality of PWM controllers is greater than the first plurality of PWM drive outputs.

19. The power supply controller of claim 15 wherein the control circuit de-couples a second PWM control signal from a second PWM controller of the second plurality of PWM controllers from controlling any PWM drive output of the first plurality of PWM drive outputs during the first time period.

20. The power supply controller of claim 15 wherein the control circuit couples a second PWM control signal from a second PWM controller of the second plurality of PWM controllers to control the second PWM drive output during the first time period.

* * * * *